(12) United States Patent
Kurashina et al.

(10) Patent No.: US 10,703,934 B2
(45) Date of Patent: Jul. 7, 2020

(54) METHOD OF FORMING A MULTILAYER COATING FILM

(71) Applicant: BASF Coatings GmbH, Münster (DE)

(72) Inventors: Toru Kurashina, Yokohama (JP); Kazuhiko Shinmura, Yokohama (JP)

(73) Assignee: BASF Coatings GmbH, Münster (DE)

( * ) Notice: Subject to any disclaimer, the term of this patent is extended or adjusted under 35 U.S.C. 154(b) by 15 days.

(21) Appl. No.: 16/078,481

(22) PCT Filed: Mar. 14, 2017

(86) PCT No.: PCT/EP2017/055938
§ 371 (c)(1),
(2) Date: Aug. 21, 2018

(87) PCT Pub. No.: WO2017/162475
PCT Pub. Date: Sep. 28, 2017

(65) Prior Publication Data
US 2019/0023938 A1 Jan. 24, 2019

(30) Foreign Application Priority Data
Mar. 22, 2016 (JP) .................................. 2016-057368

(51) Int. Cl.
| | | |
|---|---|---|
| C09D 175/04 | (2006.01) | |
| B05D 7/00 | (2006.01) | |
| C08G 18/75 | (2006.01) | |
| C08G 18/24 | (2006.01) | |
| C08G 18/34 | (2006.01) | |
| C08G 18/79 | (2006.01) | |
| C08G 18/42 | (2006.01) | |
| C08G 18/08 | (2006.01) | |
| C08G 18/62 | (2006.01) | |
| C08G 18/70 | (2006.01) | |
| C08G 18/80 | (2006.01) | |
| C08F 283/00 | (2006.01) | |
| C08G 18/66 | (2006.01) | |
| C09D 7/61 | (2018.01) | |
| C09D 7/63 | (2018.01) | |
| C08K 3/04 | (2006.01) | |
| C08K 5/00 | (2006.01) | |
| C09D 123/06 | (2006.01) | |
| C09D 123/12 | (2006.01) | |

(52) U.S. Cl.
CPC .......... *C09D 175/04* (2013.01); *B05D 7/572* (2013.01); *B05D 7/574* (2013.01); *B05D 7/577* (2013.01); *C08F 283/006* (2013.01); *C08G 18/0823* (2013.01); *C08G 18/246* (2013.01); *C08G 18/348* (2013.01); *C08G 18/4233* (2013.01); *C08G 18/6254* (2013.01); *C08G 18/6659* (2013.01); *C08G 18/706* (2013.01); *C08G 18/755* (2013.01); *C08G 18/792* (2013.01); *C08G 18/797* (2013.01); *C08G 18/80* (2013.01); *C08K 3/04* (2013.01); *C08K 5/0025* (2013.01); *C09D 7/61* (2018.01); *C09D 7/63* (2018.01); *C09D 123/06* (2013.01); *C09D 123/12* (2013.01); *B05D 2202/10* (2013.01); *B05D 2401/20* (2013.01); *B05D 2451/00* (2013.01); *B05D 2503/00* (2013.01); *B05D 2507/005* (2013.01); *B05D 2601/20* (2013.01); *B05D 2601/24* (2013.01)

(58) Field of Classification Search
None
See application file for complete search history.

(56) References Cited

U.S. PATENT DOCUMENTS

| | | | |
|---|---|---|---|
| 2009/0041943 A1 | 2/2009 | Takeshi et al. | |
| 2015/0037591 A1* | 2/2015 | Ishikura ................. | B05D 7/572 428/423.1 |
| 2015/0218405 A1* | 8/2015 | Iwata .................... | B05D 7/572 428/423.1 |

FOREIGN PATENT DOCUMENTS

| | | |
|---|---|---|
| JP | H11228654 A | 8/1999 |
| JP | 2008031360 A | 2/2008 |
| JP | 2008056914 A | 3/2008 |
| JP | 2009039668 A | 2/2009 |
| JP | 2011131135 A | 7/2011 |
| JP | 2011132324 A | 7/2011 |
| JP | 2011219619 A | 11/2011 |
| JP | 5734920 B2 | 4/2013 |
| WO | 2011010538 A1 | 1/2011 |

OTHER PUBLICATIONS

International Search Report and Written Opinion for International Patent Application No. PCT/EP2017/055938, dated Jun. 16, 2017, 9 pages.

* cited by examiner

*Primary Examiner* — Shamim Ahmed
*Assistant Examiner* — Bradford M Gates
(74) *Attorney, Agent, or Firm* — Armstrong Teasdale LLP

(57) ABSTRACT

Provided herein is a method of forming a multilayer coating film including coating, onto an object to be coated, a water-based primer coating composition, wet-on-wet coating a first water-based coloring coating composition, wet-on-wet coating a second water-based coloring coating composition, coating a clear coating composition, and simultaneous hardening of the formed multilayer coating film. The water-based primer coating composition contains a water-based polyolefin resin, a water-based polyurethane resin, a curing agent, and conductive carbon. The first and second water-based coloring coating compositions, each, as base resins, contain a core/shell-type emulsion including an acrylic resin core portion and a polyurethane resin shell portion. The clear coating composition contains a hydroxy-group-containing acrylic resin and a polyisocyanate compound.

8 Claims, No Drawings

METHOD OF FORMING A MULTILAYER COATING FILM

CROSS-REFERENCE TO RELATED APPLICATIONS

This application is a U.S. National Phase Application of International Patent Application No. PCT/EP2017/055938, filed Mar. 14, 2017, which claims the benefit of priority to Japanese Patent Application No. 2016-057368, filed Mar. 22, 2016, the entire contents of which are hereby incorporated by reference herein.

TECHNICAL FIELD

This invention relates to a method of forming a multilayer coating film using a readily available new water-based coating material composition in various fields, particularly in the field of automotive coating.

BACKGROUND

In general, methods for forming multilayer coating films on automotive bodies are carried out by forming an electrodeposition film on an object to be coated, curing this film by heating and then forming a multilayer coating film comprising an intermediate coating film, a base coating film and a clear coating film. Recently, water-based coating materials have come to be used as intermediate coating materials and base coating materials in order to reduce the quantities of volatile organic components (VOCs) used and take into account the impact on the environment.

Furthermore, due to demands for reduced energy consumption in recent years, base coating films and clear coating films are formed on preheated intermediate coating films formed on electrodeposition film without curing the intermediate coating film by heating, and these three films are then simultaneously cured by heating. This is the so-called 3 coat 1 bake (3C1B) method and is a method that has come to be used as a method for forming multilayer coating films. For example, patent No. JP5734920 (patent literature 1), discloses a method of forming a multilayer coating film using a clear coating composition containing a core/shell-type emulsion composed of a core portion of acrylic resin and a shell portion of polyurethane resin and comprising a polyisocyanate, a hydroxy-group-containing acrylic resin, and water-based coating composition comprising a polyisocyanate and/or a polycarbodiimide as a curing agent. When this method of forming a multilayer coating film is used, it allows a decrease in the heating temperature for heat curing the coating film and further energy saving can be achieved. However, a primer may be required to ensure adhesion to plastic material when applying to plastic materials. Methods of coating the same coating on both steel-plate and plastic materials have been studied from the viewpoint of energy saving. For example, Japanese Laid-Open Patent Publication No. 2011-131135 (patent literature 2), discloses a multilayer coating film forming method using a monomer mixture containing a crosslinking monomer and a water-based coating material comprising an acrylic resin emulsion obtained by emulsion polymerization, a water soluble acrylic resin, a melamine resin and propylene glycol mono alkyl ether. However, it may not be possible to secure sufficient adhesion to plastic materials when applied to them if a primer is not applied in advance.

In addition, generally automobiles are forcefully hit by small stones and the like while in motion and there is the chance of local peeling of the coating. In coating film on steel plate, chipping resistance against peeling due to impact with such small stones is important and, in particular, the coating film is required to have excellent chipping resistance at low temperatures. For example, WO2011/010538 (patent literature 3) discloses a method of forming a multilayer coating film using a urethane resin emulsion having a specific acid value and weight average molecular weight produced with a polyisocyanate component and a polyol component as raw materials and a water-based primer composition comprising an oligomer having a specific number average molecular weight and a water tolerance of 10 or more. However, when the method of forming a multilayer coating film using this water-based primer composition is applied to plastic material, sufficient adhesion to the plastic material may not be achieved.

However, in relation to a method for forming a coating film, for example, Japanese Laid-Open Patent Publication No. 2009-39668 (patent literature 4) discloses a method for forming a bright coating film characterized by using a water-based primer coating composition containing a water-based non-chlorinated polyolefin resin, water-based polyurethane resin, water-based epoxy resin, internally cross-linked acrylic particle resin, and an emulsifying agent.

However, when this water-based primer coating composition is applied to electrodeposition-coated automobile steel plate, it may not be possible to achieve sufficient quality for rigorous chipping resistance at low temperatures.

PRIOR ART LITERATURE

Patent Literature

[Patent Literature 1] Patent No. JP5734920B
[Patent Literature 2] Japanese Laid-Open Patent Publication JP2011-131135
[Patent Literature 3] WO2011/010538
[Patent Literature 4] Japanese Laid-Open Patent Publication JP2009-39668

SUMMARY OF THE INVENTION

Problems to be Solved by the Invention

An object of the invention is to provide a method of forming a multilayer coating film on both metal and plastic objects to be coated wherein by applying wet on wet the same specific 1st water-based coloring coating composition, a 2nd water-based coloring coating composition, and a clear coating composition in this order, it is possible to obtain a coating film having excellent coating film appearance, adhesion to materials, and chipping resistance even without conducting preliminary heating, after applying the same specific water-based primer coating composition and after forming a water-based primer coating.

Means for Solving the Problem

As a result of diligent research into how to solve the aforementioned problems, the inventors found that by using a water-based polyolefin resin having a specific melting point and molecular weight, a water-based polyurethane resin having a specific glass transition temperature and elongation rate, and a water-based primer coating composition comprising conductive carbon and a curing agent, and, as base resins, a 1st water-based coloring coating composition and a 2nd water-based coloring coating composition containing a core/shell-type emulsion composed of a acrylic core portion and polyurethane shell portion, and a clear coating composition having a specific glass transition point and elongation rate and containing a specific hydroxy-group-containing acrylic resin and polyisocyanate, it was possible to solve the above problems, and have completed the present invention.

That is, the invention relates to a method of forming a multilayer coating film comprising a step of coating, onto an object to be coated, a water-based primer coating composition, a step of wet-on-wet coating a 1st water-based coloring coating composition, a step of wet-on-wet coating a 2nd water-based coloring coating composition, a step of coating a clear coating composition, and a step of simultaneous hardening of the formed multilayer coating film, wherein the water-based primer coating composition contains (A) a water-based polyolefin resin with a melting point of 60-100° C. and a weight average molecular weight in the range of 50,000-250,000, (B) a water-based polyurethane resin having a glass transition temperature (Tg) of −100 to −70° C. and an elongation rate of 500% or more, (C) a curing agent, and (D) conductive carbon, the 1st water-based coloring coating composition and 2nd water-based coloring coating composition each, as base resins, comprise a core/shell-type emulsion containing an acrylic resin shell portion and a polyurethane resin shell portion.

Furthermore, the invention relates to a method of forming a multilayer coating film having a mass ratio of water-based primer coating composition component (A) and component (B) of 20/80-80/20 as resin solid content, a mass ratio of component (C) and [component (A)+component (B)] of 1/100-30/100 as solid content and, further, a mass ratio of component (D) and [component (A)+component (B)+component (C)] of 2/98-20/80 as solid content.

The invention relates to a method of forming a multilayer coating film, wherein water-based primer coating composition component (B) is a colloidal dispersion-type or emulsion-type water-based polyurethane resin.

Further, this invention relates to a method of forming a multilayer coating film, wherein water-based primer coating composition component (B) is a water-based polyurethane resin obtained by chain elongation using a polyester polyol, a polycarbonate polyol, or a polyurethane obtained by reacting a polyether polyol and a polyisocyanate and, as needed, a low molecular weight compound having at least 2 active hydrogens per molecule.

Moreover, the invention relates to a method of forming a multilayer coating film, wherein the base resins of the 1st water-based coloring coating composition and the 2nd water-based coloring coating composition have a mass ratio of 20/80-80/20 in the core portion and shell portion in the aforementioned core/shell-type emulsion, the core portion acrylic resin has a hydroxyl group value of 10-85 mg KOH/g and an acid value of 0-30 mg KOH/g, the shell portion acrylic resin has a hydroxyl group value of 20-80 mg KOH and an acid value of 10-60 mg KOH, and the mass ratio of constituent units based on dibasic acids and/or dihydric alcohols having 10 to 60 carbon atoms in the aforementioned shell portion polyurethane resin is 10 to 50 parts by mass relative to 100 parts by mass of the solid resin content of the aforementioned polyurethane resin.

Further, this invention relates to a method of forming a multilayer coating film, wherein the 1st water-based coloring coating composition and the 2nd water-based coloring coating composition are each characterized by having a mass ratio of the aforementioned core/shell-type emulsion of 5-80 parts by mass relative to 100 parts by mass for resin solid content in the base resin.

In addition, this invention relates to a method of forming a multilayer coating film, wherein the water-based 1st coloring coating composition contains a polyisocyanate compound and/or a polycarbodiimide as a curing agent.

Effects of the Invention

By using the method of forming a multilayer coating film of the invention, coating films with excellent appearance, chipping resistance, and adhesion to the object to be coated can be obtained even without preheating the steel-plate and plastic material objects to be coated.

DETAILED DESCRIPTION

Water-Based Primer Coating Composition

The water-based primer coating composition of the invention is composed of (A) a water-based polyolefin resin, (B) a water-based polyurethane resin, (C) a curing agent, and (D) conductive carbon as the main components.

Water-Based Polyolefin Resin (A)

Component (A) of the invention is a chlorine-free polyolefin resin and the chlorine-free polyolefin resin is one that has been modified with an unsaturated carboxylic acid and/or an acid anhydride.

The chlorine-free polyolefin resin may be a polyethylene resin, a polypropylene resin, or a polybutene resin and the like but a polypropylene resin is preferred. The polypropylene resin may be a propylene homopolymer resin or a copolymer resin of polypropylene and another α-olefin and the like. The copolymer resin of polypropylene and another α-olefin may be an ethylene-propylene copolymer resin, a propylene-butene copolymer resin, an ethylene-propylene-butene copolymer resin, or a propylene-hexene copolymer resin and the like. Among these, a propylene polymer resin containing propylene at 50 mol % or more is more preferred and a propylene polymer resin containing propylene at 60 mol % or more is particularly preferred.

Unsaturated carboxylic acids or acid anhydrides used for modification preferably include α,β-unsaturated carboxylic acids and/or acid anhydrides, specific examples include maleic acid or an acid anhydride thereof, itaconic acid or an acid anhydride thereof, and citraconic acid or an acid anhydride thereof, or 1 or more of these may be suitably used. The amount of modification by unsaturated carboxylic acids and/or acid anhydride is preferably 0.05-0.8 mmol, more preferably 0.07-0.5 mmol, and particularly preferably 0.1-0.35 mmol per 1 g chlorine-free polyolefin resin. This amount of modification (addition ratio) can be measured using infrared spectrum analysis by comparing the absorption intensity of carbonyl groups with a calibration curve prepared on the basis of the amount of modification (addition ratio) in known samples. When the amount of modification is less than 0.05 mmol, emulsification is difficult and when it exceeds 0.8 mmol moisture resistance decreases.

The melting point of the modified non-chlorinated polyolefin resin is 60-100° C., preferably 70-95° C. depending on the unsaturated carboxylic acids and/or acid anhydrides used in the invention. When the melting point is less than 60° C., moisture resistance decreases, and when it exceeds 100° C., the adhesivity, low-temperature impact resistance, and low-temperature flexibility decrease. The melting point of non-chlorinated polyolefin resin can be measured by increasing the temperature from −80 to 120° C. at a rate of 5° C./min using a differential scanning calorimeter (DSC-50, Shimadzu Corp.).

The weight average molecular weight of the modified non-chlorinated polyolefin resin is 50,000-250,000, preferably 70,000-210,000 depending on the unsaturated carboxylic acids and/or acid anhydrides used in the invention. When the weight average molecular weight is less than 50,000, the adhesivity decreases due to a decrease in cohesive force and there is a risk that the gasohol resistance, moisture resistance, and high-pressure car wash resistance decrease. The production of water-based resin is impaired if the weight average molecular weight exceeds 250,000. In the invention, the weight average molecular weight is the value when the weight average molecular weight measured by gel permeation chromatography (GPC) is converted to the weight-average molecular weight of polystyrene.

The modified non-chlorinated polyolefin resin modified with unsaturated carboxylic acids and/or an acid anhydride permits dispersion in an aqueous medium which is preferably hydrophilized.

To give the modified non-chlorinated polyolefin resin better water solubility depending on the unsaturated carboxylic acids and/or acid anhydride, formation of a salt can be carried out by reacting it with ammonia or an amine such as a primary to tertiary organic amine. As an amine compound, tertiary amines such as triethylamine, tripropylamine, tributylamine, dimethylethanolamine, triethanolamine, and pyridine, secondary amines such as dipropylamine, butylamine, diethanolamine, and piperidine, and primary amines such as propylamine, butylamine, ethanolamine, and aniline can be used and, in particular, tertiary amines are suitable.

The amount of ammonia or amine compound used is 0.5-3.0 moles, preferably 0.8-2.5 moles, relative to 1 mole of carboxy groups in the non-chlorinated polyolefin resin to be hydrophilized.

To improve the water solubility of the non-chlorinated polyolefin resin, surfactant may be used as necessary. As surfactants, non-ionic surfactants such as polyoxyethylene monoalkyl ethers, polyoxyethylene monoalkyl aryl ethers, and polyoxyethylene monoalkyl ester, and anionic surfactants such as polyoxyethylene alkyl aryl sulfate salts, alkyl aryl sulfate salts, and alkyl sulfate salts can be used. The amount of surfactant is preferably usually 10 mass % or less based on the non-chlorinated polyolefin resin solid content.

Moreover, hydrophilization of the non-chlorinated polyolefin resin may be carried out using a method of bonding a modified non-chlorinated polyolefin resin modified with unsaturated carboxylic acids and/or an acid anhydride to a hydrophilic polymer such as a poly(oxyethylene/oxypropylene) block copolymer. The hydrophilic polymer preferably has a weight average molecular weight of 200-100,000, more preferably 300-50,000, and furthermore preferably 500-10,000. The bonding amount of hydrophilic polymer to modified non-chlorinated polyolefin resin, depending on the unsaturated carboxylic acid and/or acid anhydride, is preferably 0.05-1.0 mmol per 1 g modified non-chlorinated polyolefin resin and particularly preferably 0.1-0.6 mmol. The example in Japanese Laid-Open Patent Publication No. 2008-031360 is a known example of such a method.

The water-based polyolefin resin component (A) is a non-chlorinated polyolefin resin, preferably a non-chlorinated polyolefin resin with improved water solubility dispersed in aqueous medium. The concentration of dispersed non-chlorinated polyolefin resin in the aqueous dispersion of non-chlorinated polyolefin resin is usually preferably 5-50 mass % and more preferably 10-40 mass %.

Apart from water, other solvents may be combined with the aqueous medium. Other solvents include, for example, aromatic hydrocarbons such as toluene and xylene, aliphatic hydrocarbons such as hexane, octane, and decane, alicyclic hydrocarbons such as cyclohexane and methylcyclohexane, halogenated hydrocarbons such as methylene chloride, carbon tetrachloride, and chlorobenzene, esters such as methyl acetate, ethyl acetate, propyl acetate, and butyl acetate, ketones such as acetone, methylethyl ketone, methyl propyl ketone, methyl isobutyl ketone, and cyclohexanone, alcohols such as methanol, ethanol, n-propanol, isopropanol, n-butanol, 2-butanol, isobutanol, t-butanol, cyclohexanol, ethylene glycol, propylene glycol, and butanediol, ethers such as dipropylether, dibutylether, and tetrahydrofuran, organic solvents having 2 or more functional groups such as 2-methoxyethanol, 2-ethoxyethanol, 2-butoxyethanol, 2-methoxypropanol, 2-ethoxypropanol, and diacetone alcohol, and polar solvents such as dimethylsulfoxide.

Among these, a solvent which dissolves in water at 1 mass % or more is preferable, further preferably 5 mass % or more, for example, methylethyl ketone, methyl propyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol, and diacetone alcohol are preferred.

Water-Based Polyurethane Resin (B)

The water-based polyurethane resin which is component (B) in the invention includes a urethane prepolymer obtained by reacting a polyfunctional isocyanate compound, a polyol having two or more hydroxyl groups in a molecule, and a hydroxy-group-containing compound having an anionic group and neutralizing and hydrophilisizing the product using ammonia, an organic amine, or an inorganic base such as potassium hydroxide, sodium hydroxide and the like. Further, the same aqueous dispersion may be used after increasing its molecular weight using a chain extender such as water, water soluble polyamines, or glycols and the like. Moreover, this may be modified with acrylic and the like as necessary.

There is no particular limit to the type of polyol used in this polyurethane resin, and polyester polyol, polyether polyol, polycarbonate polyol and the like may be used and a urethane prepolymer obtained using such polyols may be partially modified with an acrylic resin. The above inorganic bases such as potassium hydroxide, sodium hydroxide and the like may be used in hydrophilisization of the urethane prepolymer and, from the point of view of moisture resistance, low-melting, easily vaporized ammonia or an organic amine is preferred.

If the polyurethane resin contains hydroxy groups, they remain in the coating unreacted and this is not desirable as moisture resistance is lowered.

An aqueous dispersion of polyurethane resin having a measurable particle diameter and a mean particle diameter of 130 nm or less is preferable. If a water soluble polyurethane resin having an unmeasurable particle diameter before dissolution in water is used, it is not desirable as it is prone to sagging at the time of coating and the coating film appearance deteriorates.

When the mean particle diameter of the aqueous dispersion of polyurethane resin exceeds 130 nm, it is not desirable as precipitation occurs because the particles are large and hard spots and thickening easily arise. The upper limit of the mean particle diameter of the aqueous dispersion of polyurethane resin is preferably 120 nm or less and more preferably 100 nm or less. There is no particular limit to the lower limit of the particle diameter of the aqueous dispersion of polyurethane resin but 5 nm or more is preferable and 10 nm or more is more preferable.

The particle diameter of the aqueous dispersion of polyurethane resin is measured with a Nicomp 380ZLS particle size distribution zeta potential measurement device and the Gaussian distribution/volume weighting value is used.

The concentration of dispersed polyurethane resin in the aqueous dispersion of polyurethane resin is usually preferably 5-50 mass % and more preferably 10-40 mass %. In addition, the water-based medium in the water-based dispersion of polyurethane resin may contain N-methyl-2-pyrrolidone, N-ethyl-2-pyrrolidone, or 2-butoxyethanol as necessary. As a more specific example of a method of producing a water dispersion of polyurethane resin which is component (B) of the invention, publicly known methods such as that in Japanese Laid-Open Patent Publication JP2008-056914 are known. Commercial aqueous dispersions of polyurethane resin include Bayhydrol VP LS2952/1 and Bayhydrol 2342 (Sumika Bayer Urethane Co., Ltd.).

The glass transition temperature of the water-based polyurethane resin which is component (B) of the invention is preferably −100 to −70° C. and more preferably −100 to −90° C. When the glass transition temperature is lower than −100° C., the adhesion and moisture resistance may decrease because of a decrease in cohesive force of the coating film and, when it is higher than −70° C., chipping resistance may decrease due to a lack of flexibility of the coating film.

The glass transition temperature of the water-based polyurethane resin was measured using a differential scanning calorimeter (DSC-60, Shimadzu Corp.).

The elongation rate of a coating film of the water-based polyurethane resin which is component (B) of the invention is preferably 500% or more at −20° C. When the elongation rate of the coating film is less than 500%, the flexibility of the coating film decreases and the chipping resistance may decrease.

The elongation rate of a coating film of the water-based polyurethane resin was measured using a tensile testing machine by placing the water-based polyurethane resin on a polypropylene tray to form a sheet of room temperature-dried water-based polyurethane resin and, after the complete removal of water vapor at 110° C., forming the sheet into strips for measurement.

Curing Agent (C)

The curing agent which is component (C) of the invention may be, for example, an amino resin, a blocked polyisocyanate compound and the like. Such curing agents may be used singly or in a combination of 2 or more.

Amino resin is a general term for resins obtained by adding and condensing formaldehyde to an amino group-containing compound, more specifically, examples of amino resins include melamine resins, urea resins, guanamine resins and the like. Of these, melamine resins are preferred. Furthermore, it is possible to use an alkyl ether-modified amino resin obtained by etherifying some or all of the methylol groups in the amino resin by means of one or more types of alcohol selected from monohydric alcohols such as methanol, ethanol, propanol, and butanol.

In cases where an amino resin is used as a curing agent, the solid content mass ratio represented by (base resin/amino resin) is preferably 0.65-4.0 and more preferably 1.8-3.0 from the point of view of adhesion to the object to be coated, water resistance, and chipping resistance.

Blocked isocyanate compounds include compounds obtained by blocking an isocyanate group in an isocyanate compound with, for example, an alcohol such as butanol, an oxime such as methyl ethyl ketooxime, a lactam such as ε-caprolactam, a diester such as acetoacetic acid diester, an imidazole such as imidazole or 2-ethylimidazole or a phenol such as m-cresol.

Polyisocyanate compounds include aliphatic diisocyanates such as hexamethylene diisocyanate, trimethylhexamethylene diisocyanate, and dimer acid diisocyanate, alicyclic diisocyanates such as isophorone diisocyanate, xylylene diisocyanate (XDI), metaxylylene diisocyanate, and hydrogenated XDI, aromatic diisocyanates such as tolylene diisocyanate (TDI), 4,4-diphenylmethane diisocyanate (MDI), hydrogenated TDI, hydrogenated MDI, and adducts, biurets, and isocyanurates thereof. In cases where a blocked polyisocyanate compound is used as a curing agent, the NCO/OH molar ratio in the water-based primer coating composition is preferably 0.5-1.5, and more preferably 0.8 to 1.2 from the point of view of coating film appearance and adhesion to the object to be coated.

Conductive Carbon (D)

Conductive carbon which is component (D) in the invention includes carbon black. Conductive carbon has a specific surface area of, for example, 200 m$^2$/g or more and preferably 800 m$^2$/g or more. When the specific surface area is less than 200 m$^2$/g, the number of particles per unit weight of the carbon black is low and this is not desirable as conductivity decreases. The mean particle diameter of conductive carbon is preferably 10-50 nm.

In the water-based primer coating composition of the invention, the mass ratio of polyolefin resin component (A) to polyurethane resin component (B), that is, the mass ratio represented by (A)/(B) and calculated in terms of solid content, is in the range 20/80-80/20, preferably in the range 20/80-60/40, and particularly preferably in the range 20/80-40/60.

When the mass ratio of component (A) and component (B) is below 20/80, adhesivity to polypropylene materials decreases. When the mass ratio of component (A) and component (B) is higher than 80/20, poor adhesion of the 1st water-based coloring coating film arises due to a difference in polarity.

The mass ratio to the total amount of component (C) divided by component (A) and component (B), that is, the mass ratio represented by (C)/{(A)+(B)}, is the range 1/100-30/100 calculated in terms of solid content and preferably in the range 5/100-25/100. When the mass ratio component (C) divided by component (A) and component (B) is less than 1/100, there is a possibility of a decrease in adhesion and moisture resistance due to insufficient curing. When the mass ratio of component (C) divided by component (A) and component (B) is more than 30/100, there is a possibility of a decrease in moisture resistance due to excess curing agent.

The mass ratio to the total amount of conductive carbon component (D) divided by component (A), component (B) and component (C), that is the mass ratio represented by (D)/{(A)+(B)+(C)}, is in the range 2/98-20/80 calculated in terms of solid content, more preferably in the range 4/96-17/83, and particularly preferably in the range 6/94-15/85.

When the mass ratio to the total amount of conductive carbon component (D) divided by component (A), component (B) and component (C) is less than 2/98, conductivity decreases and when the mass ratio to the total amount of conductive carbon component (D) divided by component (A), component (B) and component (C) is more than 20/80, dispersion is poor, and there is a possibility of hard spots and precipitation.

In the water-based primer coating composition of the invention, coloring pigments, extender pigments, antifoaming agents, rheology control agents, pigment dispersing agents, curing catalysts, and organic solvents conventionally used in the field of coating materials can be used as necessary. Coloring pigments include titanium dioxide, red iron oxide, azo pigments, and phthalocyanine pigments, and extender pigments include talc, silica, calcium carbonate, barium sulfate, and flowers of zinc (zinc oxide). The water-based primer coating composition of the invention contains the above components and an aqueous medium, wherein the total content of the above components is preferably 15-45 mass % and more preferably 25-40 mass % calculated in terms of solid content.

1st Water-Based Coloring Coating Composition and 2nd Water-Based Coloring Coating Composition The 1st water-based coloring coating composition and 2nd water-based coloring coating composition of the invention, comprise, as base resins, a core/shell-type emulsion composed of a core portion of acrylic resin and a shell portion of polyurethane resin. The core/shell-type emulsion is obtained by synthesizing an acrylic resin comprising the core portion in a resin solution or aqueous dispersion comprising polyurethane resin making up the shell portion. Here, because the polyurethane resin contains hydrophilic groups and the acrylic resin does not contain hydrophilic groups, the polyurethane resin acts as an emulsifying agent and is disposed on the outside of micelles, whereas the acrylic acid is disposed on the inside of micelles when these resins form micelles in water and the resins thereby form a core/shell structure. Moreover, a core/shell structure means one in which two resin components having different resin compositions are present in a single micelle with one resin component forming the central part (core portion) and the other resin component forming the outer part (shell portion).

Polyurethane Resin (Shell Portion)

The polyurethane resin constituting the shell portion of the core/shell-type emulsion of the invention can be obtained by known methods using the use of polyols, polyisocyanate compounds, dimethylol alkanoic acid, and polyhydric alcohols as raw materials and, for example, includes the following methods. First, a polyol is synthesized, this polyol resin is reacted with a diol containing a carboxyl group and a polyisocyanate compound to afford a urethane prepolymer containing a terminal isocyanate. Then, by reacting the urethane prepolymer with a polyhydric alcohol, it is possible to obtain a polyurethane resin having a terminal hydroxyl group.

The above polyol resins include polyester resins, polyether resins, and polycarbonate polyol resins and polyester resins are preferred from the point of view of chipping resistance.

The polyester resin can be obtained using known methods using an esterification reaction and a polybasic acid and a polyhydric alcohol as raw material components.

Usually, a polycarboxylic acid is used as a polybasic acid but monovalent fatty acids can be used as necessary. Polycarboxylic acids include, for example, phthalic acid, isophthalic acid, tetrahydrophthalic acid, tetrahydroisophthalic acid, hexahydrophthalic acid, hexahydroterephthalic acid, trimellitic acid, adipic acid, sebacic acid, succinic acid, azelaic acid, fumaric acid, maleic acid, itaconic acid, pyromellitic acid and the like and acid anhydrides thereof. These polybasic acids can be used alone or in combinations of 2 or more.

Polyhydric alcohols include glycol and trivalent or higher polyhydric alcohols. Glycols include, for example, ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentadiol, 1,6-hexanediol, 2-butyl-2-ethyl-1,3-propanediol, methyl propane diol, cyclohexanedimethanol, 3,3-diethyl-1,5-pentadiol and the like. In addition, trivalent or higher polyhydric alcohols include, for example, glycerin, trimethylolethane, trimethylolpropane, pentaerythritol, dipentaerythritol and the like. These polyhydric alcohols can be used alone or in combinations of 2 or more.

The number average molecular weight of segment resin is preferably 1,000-5,000, suitable specific examples include 1,000, 1,500, 2,000, 2,500, 3,000, 3,500, 4,000, 4,500, and 5,000 and the like or it may be within the range between any two of the numerical values shown.

Then, the segment resin obtained in this way is reacted with a diol containing a carboxyl group and a polyisocyanate compound to afford a urethane prepolymer containing a terminal isocyanate. Diols containing a carboxyl group to be reacted with the segment resin include, for example, dimethylolpropionic acid, dimethylolbutanoic acid, dimethylolpentanoic acid, dimethylolheptanoic acid, dimethyloloctanoic acid, dimethylolnonanoic acid and the like. Of these, from the point of view of superior coating films and industrial cost and the like, dimethylolpropionic acid and dimethylolbutanoic acid are preferred. These diols containing a carboxyl group can be used alone or in combinations of 2 or more.

Polyisocyanates to be reacted with segment resin include, for example, aromatic diisocyanates such as 4,4'-diphenylmethane diisocyanate, 2,4- or 2,6-tolylene diisocyanate, 1,5-naphthalene diisocyanate, and p- or m-phenylene diisocyanate, alicyclic diisocyanates such as isophorone diisocyanate, 4,4'-dicyclohexylmethane diisocyanate, 1,4-cyclohexylene diisocyanate, and hydrogenated products of tolylene diisocyanate, aliphatic diisocyanates such as hexamethylene diisocyanate, and xylylene diisocyanate and m-tetramethyl xylylene diisocyanate. Of these, from the point of view of yellow discoloration resistance, alicyclic diisocyanates are preferred. These polyisocyanates can be used alone or in combinations of 2 or more.

Finally, by reacting the urethane prepolymer thus obtained with a polyhydric alcohol, a polyurethane resin having a terminal hydroxy group can be obtained.

Polyhydric alcohols to be reacted with a urethane prepolymer include, for example, ethylene glycol, propylene glycol, 1,3-butylene glycol, 1,4-butanediol, 1,6-hexanediol, diethylene glycol, dipropylene glycol, neopentyl glycol, triethylene glycol, hydrogenated bisphenol A, trimethylolethane, trimethylolpropane, pentaerythritol, dipentaerythritol and the like. These polyhydric alcohols can be used alone or in combinations of 2 or more.

By introducing a specific proportion of a dibasic acid and/or dihydric alcohol having 10 to 60 carbon atoms in the polyurethane resin in the present invention, it is possible to obtain a coating film having an excellent appearance. The dibasic acid and/or dihydric alcohol having 10 to 60 carbon atoms may be introduced into the above-mentioned segment resin or into another component, but by using a dibasic acid and/or dihydric alcohol having 10 to 60 carbon atoms as a raw material used in the synthesis of the above-mentioned segment resin, it is possible to obtain a coating film having an outstanding appearance.

From the point of view of coating film appearance, the dibasic acid and/or dihydric alcohol preferably have 30-40 carbon atoms, and more preferably 34-38 carbon atoms.

When the dibasic acid and/or dihydric alcohol has fewer than 10 carbon atoms, the polarity of the polyurethane resin of the shell portion increases, meaning that layer mixing occurs between the 1st water-based coloring coating material and the 2nd water-based coloring coating material, which can cause the appearance of the coating film to deteriorate, and when the dibasic acid and/or dihydric alcohol has more than 60 carbon atoms, the water solubility of the polyurethane resin of the shell portion deteriorates, meaning that the acrylic resin that forms the core portion and the polyurethane resin that forms the shell portion can, in some cases, fail to form a core/shell structure.

The abovementioned $C_{10-60}$ dibasic acids include, for example, sebacic acid, 1,9-nonane dicarboxylic acid, 1,10-decane dicarboxylic acid, 1,11-undecane dicarboxylic acid, 1,12-decane dicarboxylic acid, 1,13-tridecane dicarboxylic acid, 1,14-tetradecane dicarboxylic acid, 1,15-pentadecane dicarboxylic acid, 1,16-hexadecane dicarboxylic acid, 2-hexadecyl malonic acid, 1,18-octadecane dicarboxylic acid, dimer acid, hydrogenated dimer acid and the like. Of these, from the point of view of better coating film appearance, dimer acid is preferred. These $C_{10-60}$ dibasic acids can be used alone or in combinations of 2 or more.

The abovementioned $C_{10-60}$ dihydric alcohols include, for example, 1,10-decanediol, 1,2-decanediol, 3,6-dimethyl-3,6-octanediol, 2,2-dibutylpropane-1,3-diol, 1,12-dodecanediol, 1,2-dodecanediol, 1,13-tridecanediol, 2,2-diisoamyl-1,3-propanediol, 1,14-tetradecanediol, 1,2-tetradecanediol, 1,15-pentadecanediol, 1,16-hexadecanediol, 1,2-hexadecanediol, 1,2-heptadecanediol, 1,12-octadecanediol, 2,2-di-n-octyl-1,3-propanediol, 1,20-eicosanediol, dimer diol and the like. Of these, from the point of view of better coating film appearance, dimer diol is preferred. These $C_{10-60}$ dihydric alcohols can be used alone or in combinations of 2 or more.

The total mass ratio of constituent units derived from dibasic acids and/or dihydric alcohols having 10-60 carbon atoms is 10-50 mass % relative to the solid resin content of the polyurethane resin that forms the shell portion and, from the point of view of the appearance of the coating film, is preferably 20-40 mass % and more preferably 30-35 mass %. When the total mass ratio of dibasic acid and/or dihydric alcohol is lower than 10 mass %, the polarity of the polyurethane resin increases, meaning that layer mixing occurs between the 1st water-based coloring coating composition and the 2nd water-based coloring coating material which can cause the appearance of the coating film to deteriorate, and when the total mass ratio of dibasic acid and/or dihydric alcohol exceeds 50 mass %, dryness is too high, meaning that satisfactory flowability cannot be achieved and the coating film appearance can deteriorate.

The polyurethane resin that forms the shell portion has a sufficient quantity of hydrophilic groups in order to enable water solubility or water dispersibility and also has a functional group for reacting with a curing agent. Specific examples of this hydrophilic group include carboxyl groups, amino groups, methylol groups and the like.

The polyurethane resin that forms the shell portion has a hydroxyl group value of 20-80 mg KOH/g and, from the point of view of adhesion to an object to be coated, is preferably 30-70 mg KOH/g and more preferably 35-45 mg KOH/g. When the hydroxyl value is lower than 20 mg KOH/g, adhesion to an object to be coated can deteriorate and when the hydroxyl value exceeds 80 mg KOH/g, the polarity of the polyurethane resin increases, meaning that layer mixing occurs between the 1st water-based coloring coating material and the 2nd water-based coloring coating material which can cause the coating film appearance to deteriorate.

In addition, the acid value of the polyurethane resin that forms the shell portion is 10-60 mg KOH/g and, from the point of view of coating film appearance, is preferably 30-40 mg KOH/g. When the acid value is lower than 10 mg KOH/g, the emulsion stability of the polyurethane resin in an aqueous medium deteriorates which can cause the coating film appearance to deteriorate, and when the acid value exceeds 60 mg KOH/g, the water solubility of the polyurethane resin becomes too high meaning that layer mixing occurs between the 1st water-based coloring coating material and the 2nd water-based coloring coating material which can cause the coating film appearance to deteriorate.

The number average molecular weight of the polyurethane resin that forms the shell portion is not particularly limited but is, for example, between 500 and 50,000 and specific examples of this number average molecular weight include 500, 1,500, 2,500, 3,500, 4,500, 5,500, 6,500, 7,500, 10,000, 15,000, 20,000, 30,000, 40,000, or 50,000 or may be within the range of any two numbers exemplified here. The number average molecular weight in the description of the invention is a value obtained by gel permeation chromatography (GPC) using polystyrene as a standard substance.

Acrylic Resin (Core Portion)

The acrylic resin comprising the core portion can be obtained by known methods using a radical polymerization reaction and a radical polymerizable monomer as a raw material and is synthesized in an aqueous resin solution or aqueous dispersion of the polyurethane resin comprising the shell portion.

The radical polymerizable monomer includes, for example, (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, hexyl (meth)acrylate, cyclohexyl (meth)acrylate, 2-ethylhexyl (meth)acrylate, octyl (meth)acrylate, lauryl (meth)acrylate, stearyl (meth)acrylate, allyl alcohol, 2-hydroxyethyl (meth)acrylate, 3-hydroxypropyl (meth)acrylate, 4-hydroxybutyl (meth)acrylate, styrene, (meth)acrylonitrile, (meth)acrylamide and the like. These radical polymerizable monomers can be used alone or in combinations of 2 or more.

A radical polymerization initiator may be used in the synthesis of acrylic resin. Radical polymerization initiators include, for example, azo compounds such as 2,2'-azobisisobutyronitrile, 2,2'-azobis-2,4-dimethyl valeronitrile, 4,4'-azobis-4-cyanovalerate, 1-azobis-1-cyclohexanecarbonitrile, and dimethyl-2,2'-azobisisobutyrate, and organic peroxides such as methyl ethyl ketone peroxide, cyclohexanone peroxide, 3,5,5-trimethylhexanine peroxide, 1,1-bis(t-butylperoxy)-3,3,5-trimethylcyclohexane, 1,1-bis(t-butylperoxy)cyclohexane, 2,2-bis(t-butylperoxy)octane, t-butylhydroperoxide, diisopropylbenzene hydroperoxide, dicumyl peroxide, t-butylcumyl peroxide, isobutyl peroxide, lauroyl peroxide, benzoyl peroxide, diisopropyl peroxydicarbonate, t-butylperoxy-2-ethylhexanoate, t-butyl peroxyneodecanate, t-butyl peroxylaurate, t-butyl peroxybenzoate, t-butyl peroxyisopropyl carbonate and the like. Such radical polymerization initiators may be used singly or in a combination of 2 or more.

The hydroxyl group value of the acrylic resin comprising the core portion is 40-140 mg KOH/g and, from the point of view of coating film appearance and adhesion to the object to be coated, is preferably 60-120 mg KOH/g and more preferably 75-85 mg KOH/g. When the hydroxyl group value is less than 40 mg KOH/g, adhesion to the object to be coated may deteriorate, when it exceeds 140 mg KOH/g the polarity of the core portion becomes excessively high so the acrylic resin which should form the core portion and the polyurethane resin which should form the shell portion do not form a core/shell structure and the coating film appearance may deteriorate.

The acid value of the acrylic resin comprising the core portion is 0-10 mg KOH/g and, from the point of view of coating film appearance, is preferably 0-5 mg KOH/g and more preferably 0-3 mg KOH/g. When the acid value exceeds 10 mg KOH/g, the acrylic resin which should form the core portion and the polyurethane resin which should form the shell portion may not form a core/shell structure.

There is no particular limit to the glass transition temperature (Tg) of the acrylic resin comprising the core portion, which may be, for example, 20-60° C., more specifically, for example, 20, 25, 30, 35, 40, 45, 50, 55, or 60° C. or it may be within the range between any two of the numerical values shown.

It is difficult to accurately measure the number average molecular weight of the acrylic resin comprising the core portion as it is synthesized in an aqueous resin solution or aqueous dispersion of the polyurethane resin comprising the shell portion. The number average molecular weight of the acrylic resin mainly varies according to the weight of radical polymerization initiator used in synthesis and the reaction temperature of synthesis. The reaction temperature of synthesis is, for example, 60-110° C., more specifically, for example, 60, 70, 80, 90, 100, or 110° C. and may be within the range of any two numbers exemplified here. The amount of radical polymerization initiator to be used in synthesis, for example, is 0.1-3.0 mass % based on radical polymerizable monomer taken as 100 mass %, more specifically, for example, is 0.1, 0.5, 1.0, 1.5, 2.0, 2.5, or 3.0 mass % or it may be within the range between any two of the numerical values shown.

The mass ratio of the core portion and shell portion in the core/shell-type emulsion resin constituting the 1st water-based coloring coating composition and 2nd water-based coloring coating composition of the invention is 20/80-80/20 and, from the point of view of coating film appearance, is preferably 35/65-65/35 and more preferably 45/55-55/45. When the mass ratio of the core portion is less than 20, the water solubility of the core/shell-type emulsion resin increases, layer mixing occurs between the 1st water-based coloring coating composition and 2nd water-based coloring coating composition and the coating film appearance may deteriorate. However, when the mass ratio of the core portion exceeds 80, the particle properties of the core portion acrylic resin strengthen and the coating film appearance may deteriorate.

In order for the core/shell-type emulsion resin to be present in a stable manner in the 1st water-based coloring coating composition and 2nd water-based coloring coating composition of the present invention, it is preferable to neutralize some or all of the carboxyl groups in the aforementioned core/shell-type emulsion resin by means of a basic substance and impart self-emulsifying properties. Basic substances to be used in neutralization include, for example, ammonia, morpholine, N-alkylmorpholine, monoisopropanolamine, methyl ethanolamine, methyl isopropanolamine, dimethylethanolamine, diisopropanolamine, diethanolamine, triethanolamine, diethylethanolamine, triethanolamine, methylamine, ethylamine, propylamine, butylamine, 2-ethylhexylamine, dimethylamine, diethylamine, dipropylamine, butylamine, trimethylamine, triethylamine, triisopropylamine and tributylamine and the like. Such basic substances may be used singly or in a combination of 2 or more.

In the water-based coloring coating composition of the invention, the mass ratio of the core/shell-type emulsion relative to the total weight of solid resin content of the base resin, from the point of view of coating film appearance, is preferably 5-80 mass % and more preferably 10-40 mass %.

The water-based coloring coating composition of the invention preferably contains, as a base resin, a known water-based resin other than the abovementioned core/shell-type emulsion resin. Known water-based resin is preferably at least one chosen from polyurethane resin and acrylic resin.

The hydroxyl group value of the water-based polyurethane resin is, for example, preferably 10-140 mg KOH/g and the acid value is, for example, preferably 3-80 mg KOH/g.

The number average molecular weight of the water-based polyurethane resin is preferably 1,000-100,000. Here the number average molecular weight is, more specifically, for example, 1,000, 5,000, 10,000, 20,000, 40,000, 60,000, 80,000, or 100,000 or it may be within the range between any two of the numerical values shown.

The hydroxyl group value of the water-based acrylic resin is, for example, preferably 10-200 mg KOH/g and the acid value is, for example, preferably 0-20 mg KOH/g, the glass transition temperature is, for example, preferably −40 to 80° C. The value for the glass transition temperature disclosed in the patent description is the value of the transition initiation temperature in DSC (differential scanning calorimetry).

The number average molecular weight of the water-based acrylic resin is preferably 1,000-1,000,000. This number average molecular weight is, more specifically, for example, 1,000, 5,000, 10,000, 50,000, 100,000, 200,000, 400,000, 600,000, 800,000, or 1,000,000 or it may be within the range between any two of the numerical values shown.

Various pigments such as coloring pigments, bright pigments, extender pigments and the like may be included in the water-based coloring coating composition of the invention. Coloring pigments include, for example, inorganic pigments such as chrome yellow, yellow iron oxide, iron oxide, carbon black, titanium dioxide and the like, and organic pigments such as azochelate pigments, insoluble azo pigments, condensed azo pigments, phthalocyanine pigments, indigo pigments, perinone pigments, perylene pigments, dioxane pigments, quinacridone pigments, isoindolinone pigments, metal complex pigments and the like. In addition, bright pigments include, for example, aluminum flake pigments, alumina flake pigments, mica pigments, silica flake pigments, glass flake pigments and the like. Moreover, extender pigments include, for example, calcium carbonate, barite, precipitated barium sulfate, clay, talc and the like. These pigments may be used singly or in a combination of 2 or more.

The mass ratio when pigment is added to the water-based coloring coating composition of the invention is, for example, 3-200 mass % compared to the total amount of the solid resin content in the base resin and is, more specifically, for example, 3, 5, 15, 30, 50, 70, 90, 110, 130, 150, 175, or 200 mass % or may be within the range of any two numbers exemplified here.

One or more types of additive such as surface modifiers, anti-foaming agents, surfactants, auxiliary film-forming agents, preservatives, ultraviolet radiation absorbers, photo-stabilizers and antioxidants, and various rheology control agents and various organic solvents may be incorporated in the water-based coloring coating composition of the present invention.

The water-based coloring coating composition of the present invention contains water as a medium but is used after adding water, if necessary, and a small quantity of an organic solvent or an amine as the need dictates in order to dilute to an appropriate viscosity before coating. In the method of forming a multilayer coating film of the invention, if the 1st water-based coloring coating composition and 2nd water-based coloring coating composition of the invention are used as water-based coloring coating compositions, adhesion to the object to be coated can be assured even if the 2nd water-based coloring coating composition does not contain a curing agent.

Curing agents for the water-based coloring coating composition of the invention include, for example, amino resins, polyisocyanates, blocked polyisocyanates, polycarbodiimides and the like. Of these, from the point of view of coating film appearance, polyisocyanates and polycarbodiimides are preferred. Moreover, these curing agents may be used singly or in a combination of 2 or more.

Amino resin is a general term for resins obtained by adding and condensing formaldehyde to an amino group-containing compound, more specifically, examples of amino resins include melamine resins, urea resins, guanamine resins and the like. Of these, melamine resins are preferred. Furthermore, it is possible to use an alkyl ether-modified amino resin obtained by etherifying some or all of the methylol groups in the amino resin by means of one or more types of alcohol selected from monohydric alcohols such as methanol, ethanol, propanol, and butanol.

In cases where an amino resin is used as a curing agent, the solid content mass ratio represented by (base resin/amino resin) is preferably 0.65-4.0 and more preferably 1.8-3.0 from the point of view of the adhesion to the object to be coated, water resistance, and chipping resistance.

Polyisocyanate compounds include aliphatic diisocyanates such as hexamethylene diisocyanate, trimethylhexamethylene diisocyanate, and dimer acid diisocyanate, alicyclic diisocyanates such as isophorone diisocyanate, xylylene diisocyanate (XDI), metaxylylene diisocyanate, and hydrogenated XDI, aromatic diisocyanates such as tolylene diisocyanate (TDI), 4,4-diphenylmethane diisocyanate (MDI), hydrogenated TDI, hydrogenated MDI, and adducts, biurets and isocyanurates thereof.

Blocked isocyanate compounds include compounds obtained by blocking an isocyanate group in an isocyanate compound with, for example, an alcohol such as butanol, an oxime such as methyl ethyl ketooxime, a lactam such as ε-caprolactam, a diketone such as acetoacetic acid diester, an imidazole such as imidazole or 2-ethylimidazole or a phenol such as m-cresol.

When polyisocyanates and blocked polyisocyanates are used as curing agents, the NCO/OH molar ratio in the water-based coloring coating composition is preferably 0.5-1.5 and more preferably 0.8 to 1.2 from the point of view of coating film appearance and adhesion to the object to be coated.

Hydrophilic carbodiimides are preferred as polycarbodiimides. Examples of hydrophilic polycarbodiimides include, for example, compounds obtained by reacting a polycarbodiimide compound having at least two isocyanate groups per molecule with a polyol having a hydroxyl group at a molecular terminal at such proportions that the NCO/OH molar ratio is greater than 1 and then the obtained reaction product is reacted with a hydrophilizing agent having an active hydrogen atom and a hydrophilic moiety.

In cases where a polycarbodiimide compound is used as a curing agent in the present invention, the NCN/COOH molar ratio in the water-based coating composition is preferably 0.5-2.0, and more preferably 0.8-1.5, from the point of view of coating film appearance and adhesion to an object to be coated.

The form of the water-based coloring coating composition of the present invention is not particularly limited as long as the form is water-based, such as water-soluble, water dispersible or a water-based emulsion.

Clear Coating Composition

Any organic solvent coating, water-based coating material, or powder coating material can be used as a clear coating composition to be used in the method of forming a multilayer coating film of the invention. Base resins of clear coating composition include acrylic resins, polyester resins, alkyd resins and the like, the curing system includes melamine curing, acid/epoxy curing, isocyanate curing and the like and, from the point of view of coating film appearance, acrylic resin/isocyanate curing-type clear coating compositions are preferred.

The hydroxy-group-containing acrylic resin is not particularly limited and can be obtained by known methods such as radical polymerization of an ethylenic unsaturated monomer like an acrylic monomer. For example, at least one type of hydroxyl group-containing monomer such as an ester of acrylic acid or methacrylic acid with a hydroxyl group-containing alkyl group such as 2-hydroxyethyl, 3-hydroxypropyl, 4-hydroxybutyl and the like, a caprolactone ring-opened adduct of 2-hydroxyethyl acrylate or methacrylate, or an ethylene oxide or propylene oxide adduct of 4-hydroxybutyl acrylate or methacrylate and the like as an ethylenic unsaturated monomer is included as an essential component.

Other acrylic monomers that can be co-polymerized with the abovementioned hydroxyl group-containing monomers in the hydroxy-group-containing acrylic resin include acrylic acid or methacrylic acid, methyl acrylate or methyl methacrylate, esters of hydrocarbon groups such as ethyl, n-propyl, isopropyl, n-butyl, isobutyl, t-butyl, hexyl, cyclohexyl, 2-ethylhexyl, lauryl, stearyl and the like, and acrylonitrile, methacrylonitrile, acrylamide, methacrylamide and the like. Other co-polymerizable ethylenic unsaturated monomers include styrene, α-methylstyrene, maleic acid, vinyl acetate and the like. These copolymerizable monomers may be used alone or in combination of two or more.

Polyisocyanates for isocyanate curing include aliphatic polyisocyanates and are preferable in order to exhibit favorable chipping resistance. The mixing proportions of curing agent and hydroxy-group-containing acrylic resin may be the same as the mixing proportions of a conventional 2 liquid-type urethane coating material.

The clear coating composition of the invention preferably has a glass transition temperature of the cured coating material of 70° C. or more. When this is below 70° C., coating film strength is insufficient. A cured coating film of the clear coating composition preferably has an elongation rate of 7% or less and more preferably 3% or less at 23° C. When the elongation rate of the cured coating film is more than 7%, the coating film strength is insufficient and there are problems like the coating film is softened by organic solvents such as gasoline and it is prone to abnormal swelling.

A cured coating film of clear coating composition was applied to a PP plate to a thickness of 30 μm, it was heat cured for 30 minutes at 120° C. to form a cured coating film of clear coating composition, the coating film was peeled from the PP plate and cut into strips to prepare samples. Measurement of the glass transition temperature was carried out using a dynamic viscoelasticity measuring device. The elongation rate was measured using a tensile testing machine.

The clear coating composition to be used in the invention may contain, in addition to the abovementioned resin components, an ultraviolet absorbing agent such as benzotriazole, a photostabilizer such as a hindered amine, a curing catalyst such as an organotin compound, a flow control agent such as a wax, and additives such as a leveling agent. The form of the clear coating composition used in the invention is not particularly limited and organic solvent-type coating materials are preferably dissolved or dispersed in an organic solvent using one or two or more aromatic solvents such as toluene and xylene, aliphatic solvents such as mineral spirits, ester solvents such as ethyl acetate and butyl acetate, and ketone solvents such as methylethyl ketone.

Various coating methods in the method of forming a multilayer coating film of the invention can be methods usually used in the automotive industry, for example, air spray coating, air atomization electrostatic coating and rotary atomization-type bell coating.

In the method of forming a multilayer coating film of the invention, the coating conditions of the water-based base coating composition are preferably a temperature of 10-40° C. and a relative humidity of 65-85%.

In the method of forming a multilayer coating film of the invention, preheating may be carried out after coating a water-based primer coating composition and after coating a 1st water-based coloring coating composition and after coating a 2nd water-based coloring coating composition but, when the water-based coloring coating composition of the invention is used, excellent coating film appearance can be achieved without preheating after coating a 1st water-based coloring coating composition.

In the method of forming a multilayer coating film of the invention, if the curing agent for the 1st water-based coloring coating composition and 2nd water-based coloring coating composition is a polyisocyanate and/or carbodiimide, or if the curing agent of the 1st water-based coloring coating composition is a polyisocyanate and/or a carbodiimide, or if the 2nd water-based coloring coating composition does not contain a polyisocyanate and/or a carbodiimide as a curing agent, the curing temperature of the multilayer coating film is 90-120° C. by using an isocyanate-curable clear coating composition. The heat curing time is preferably 20-40 minutes.

The various coating material compositions of the invention can be coated on both pre-coated steel plate and pre-treated plastic material objects to be coated in automobiles.

With the multilayer coating film obtained by the forming method of the invention, the initial appearance is, of course, excellent but in environments where small stones may collide at low temperatures such as when the automobile is travelling at high speed in cold locations, localized peeling of the coating film is less likely to occur and the coating film surface can maintain its esthetic appearance.

EXAMPLES

The invention is described in more detail in the following examples but the invention is not limited to these examples. Moreover, in the examples, 'parts' means 'mass %' unless otherwise specified and '%' relating to the formulated amount and content means 'mass %'.

Production Example 1: Production of Aqueous Dispersion P-1 of Non-Chlorinated Polyolefin Resin The aqueous dispersion of non-chlorinated polyolefin resin used in the invention is manufactured using the following 3 processes.

(i) Stage 1: Production of Non-Chlorinated Polyolefin Resin 110 mL Deionized water, 22.2 g magnesium sulfate heptahydrate, and 18.2 g sulfuric acid were charged into a 1,000 mL round-bottomed flask and dissolved with stirring. 16.7 g Commercially available granulated montmorillonite was added to this solution, it was heated to 100° C. and stirred for 2 hours. Thereafter, it was cooled to room temperature, the obtained slurry was filtered and a wet cake was recovered. The recovered cake was re-slurrified in a 1,000 mL round-bottomed flask with 500 mL desalted water and filtered. Drying was repeated twice. The finally obtained cake was dried overnight at 110° C. in a nitrogen atmosphere to obtain 13.3 g chemically treated montmorillonite. 20 mL Of a toluene solution of triethylaluminum (0.4 mmol/ml) was added to 4.4 g of the chemically treated montmorillonite and stirred at room temperature for 1 hour. 80 mL Toluene was added to this suspension and the supernatant was removed after stirring. After drying had been repeated twice, toluene was added and a clay slurry (slurry concentration=99 mg clay/mL) was obtained.

0.2 mmol Triisobutyl aluminum was added to a separate flask, 19 mL of the obtained clay slurry and a toluene dilution of 131 mg (57 μmol) dichloro[dimethylsilylene (cyclopentadienyl)(2,4-dimethyl-4H-5,6,7,8-tetrahydro-1-azulene) hafnium were added, and stirred for 10 minutes at room temperature to obtain a catalyst slurry.

Next, 11 L toluene, 3.5 mmol triisobutyl aluminum, and 2.64 L liquid propylene were introduced into a 24 L capacity induction-stirred autoclave. The entire amount of the abovementioned catalyst slurry was added at room temperature, it was heated to 62° C. and continuously stirred for 2 hours at the same temperature while maintaining a fixed total pressure of 0.65 MPa at the time of polymerization. After the completion of stirring, unreacted propylene was purged to stop polymerization. The autoclave was started, toluene solution from the polymer was completely recovered and 11 kg of an 11.0% toluene solution of the propylene polymer was obtained. The weight average molecular weight Mw of the obtained propylene polymer was 210,000.

(ii) Stage 2: Production of Maleic Anhydride Modified Non-Chlorinated Polyolefin Resin 200 g Propylene polymer obtained in Stage 1 shown in the above (i) and 300 g toluene were added to a glass flask fitted with a reflux condensing tube, thermometer, and stirrer, the container was flushed with nitrogen gas and heated to 110° C. After heating, 12 g maleic anhydride was added, 6 g t-butyl peroxy isopropyl monocarbonate (NOF, Perbutyl I) was added, and stirring at the same temperature was continued for 7 hours to carry out the reaction. After completion of the reaction, the system was cooled to around room temperature, acetone was added and the precipitated polymer was filtered out. Further, precipitation/filtration using acetone was repeated and the finally obtained polymer was washed in acetone. After washing, a white, powdered maleic anhydride-modified polymer was obtained by vacuum drying the obtained polymer. The results of infrared absorption spectrum measurements of this modified polymer showed that the amount of the maleic anhydride moiety (graft rate) was 1.3% (0.13 mmol as a maleic anhydride moiety/1 g propylene polymer), the weight average molecular weight was 120,000, and the melting point measured using a differential scanning calorimeter (DS-50) was 80° C.

(iii) Stage 3: Production of an Aqueous Dispersion of Maleic Anhydride-Modified Non-Chlorinated Polyolefin Resin 100 g maleic anhydride-modified propylene polymer (maleic anhydride content 13 mmol) obtained in Stage 2 shown in the above (ii) and 250 g toluene were added to a glass flask fitted with a reflux condensing tube, thermometer, and stirrer, and this was heated to 110° C. to fully dissolve the contents. Next, a solution of 30 g (30.0 mmol, corresponding to 30 parts by mass to 100 parts by mass propylene polymer) poly(oxyethylene/oxypropylene) block copolymer (molecular weight 1000) dissolved in 22.5 g toluene was added and reacted for 3 hours at 110° C.

Toluene was evaporated off under reduced pressure after cooling and 115 g of a yellow polymer was obtained. The results of infrared absorption spectrum analysis of the obtained product showed disappearance of a peak at around 1784 cm$^{-1}$ corresponding to maleic anhydride and it was confirmed that maleic anhydride-modified propylene polymer and polyether bonded. A graft copolymer with propylene grafted to the maleic anhydride-modified propylene polymer is formed. 160 g Tetrahydrofuran (THF) was added to 40 g of the obtained modified polymer and was allowed to completely dissolve at 65° C. 200 g pure water was added dropwise at the same temperature over 1 hour and a translucent pale yellow solution was obtained. This was cooled to 50° C., the pressure was gradually decreased from 0.03 MPa to 0.0045 MPa, THF and water were distilled off under reduced pressure until the solid resin content became 30% and a translucent, pale yellow water-based resin dispersion P-1 was obtained.

When the poly(oxyethylene/oxypropylene) block copolymer used in the examples was allowed to dissolve in water at 25° C. at a concentration of 10 mass %, the insoluble matter was 1 mass % or less and was hydrophilic polymer.

Production Example 2: Production of Water-Based Primer Coating Composition WP-1

1.66 Parts conductive carbon black (tradename, Printex XE2B, Degussa KK), 12.55 parts titanium dioxide (tradename, JR 600-E, Tayca KK), 0.93 parts pigment dispersing agent (tradename, Disperbyk 191, BYK Chemie KK, solid content 98%, acid value 31 mg KOH/g, amine value 20 mg KOH/g) were added to 26.5 parts polyurethane resin (tradename, Impranil DLU, Covestro Japan Ltd, solid resin content 60%, Tg-83° C., elongation rate 800%), after dispersion in a dispersing machine, 21.0 parts of aqueous dispersion of non-chlorinated polyolefin resin P-1, 1.5 parts of a curing agent (tradename Duranate WM44-L70G, water-dispersible blocked polyisocyanate compound, Asahi Kasei KK, solid resin content 70%), 33.96 parts de-ionized water, 0.8 parts leveling agent (tradename BYK-348, BYK Chemie KK), and 1.1 parts thickening agent (Rheovis AS 5130, BASF Japan KK, solid content 30%) were added, mixed in a dissolver then dimethylethanolamine was added to adjust the pH to 7-8 to produce water-based primer coating composition WP-1.

Production Example 3: Production of Water-Based Primer Coating Compositions WP-2 to WP-21

Water-based coloring coating compositions WP-2 to WP-21 were obtained using the same method as in production example 2 based on combinations shown in Table 1.

TABLE 1

| | Water-based primer coating composition | WP-1 | WP-2 | WP-3 | WP-4 | WP-5 |
|---|---|---|---|---|---|---|
| A: polyolefin resin | Aqueous dispersion of non-chlorinated polyolefin resin P-1 | 21 | 21 | 21 | 2.1 | 21 |
| B: polyurethane resin | Impranil DLU | 26.5 | | | | |
| | Acrit WBR-2181 (*1) | | 48.18 | | | |
| | Pamarin UA-150 (*2) | | | 53 | | |
| | Ucoat DA-100 (*3) | | | | 45.43 | |
| | Takelac W6061 (*4) | | | | | 53 |
| | Bayhydrol UH2952/1 (*5) | | | | | |
| | Acrit WBR-2018 (*6) | | | | | |
| | Takelac W6021 (*7) | | | | | |
| | Lackstar 5215A (*8) | | | | | |
| C: curing agent | DURANATE WM44-L70G | 1.5 | 1.5 | 1.5 | 1.5 | 1.5 |
| | Mycoat775 (*9) | | | | | |
| D: conductive carbon | Printex XE2B | 1.66 | 1.66 | 1.66 | 1.66 | 1.66 |
| Titanium dioxide | JR600-E | 12.55 | 12.55 | 12.55 | 12.55 | 12.55 |
| Pigment dispersing agent | Disperbyk 191 | 0.93 | 0.93 | 0.93 | 0.93 | 0.93 |
| Leveling agent | BYK-348 | 0.8 | 0.8 | 0.8 | 0.8 | 0.8 |
| Thickening agent | Rheovis AS S130 | 1.1 | 1.1 | 1.1 | 1.1 | 1.1 |
| | Deionized water | 33.96 | 12.28 | 7.46 | 15.03 | 7.46 |
| | Total | 100 | 100 | 100 | 100 | 100 |
| A: polyolefin resin | melting point (° C.) | 80 | 80 | 80 | 80 | 80 |
| | Weight average molecular weight | 120,000 | 120,000 | 120,000 | 120,000 | 120,000 |

TABLE 1-continued

| | | | | | | |
|---|---|---|---|---|---|---|
| B: polyurethane resin | Glass transition temperature (° C.) | −83 | −89 | −87 | −80 | −79 |
| | Elongation rate (%) | 800 | 700 | 600 | 500 | 1000 |
| | A/B | 28/72 | 28/72 | 28/72 | 28/72 | 28/72 |
| | C/(A + B) | 5/100 | 5/100 | 5/100 | 5/100 | 5/100 |
| | D/(A + B + C) | 7/93 | 7/93 | 7/93 | 7/93 | 7/93 |

| | Water-based primer coating composition | WP-6 | WP-7 | WP-8 | WP-9 |
|---|---|---|---|---|---|
| A: polyolefin resin | Aqueous dispersion of non-chlorinated polyolefin resin P-1 | 21 | 21 | 21 | 21 |
| B: polyurethane resin | Impranil DLU | | | | |
| | Acrit WBR-2181 (*1) | | | | |
| | Pamarin UA-150 (*2) | | | | |
| | Ucoat DA-100 (*3) | | | | |
| | Takelac W6061 (*4) | | | | |
| | Bayhydrol UH2952/1 (*5) | 39.75 | | | |
| | Acrit WBR-2018 (*6) | | 45.43 | | |
| | Takelac W6021 (*7) | | | 53 | |
| | Lackstar 5215A (*8) | | | | 33.61 |
| C: curing agent | DURANATE WM44-L70G | 1.5 | 1.5 | 1.5 | 1.5 |
| | Mycoat775 (*9) | | | | |
| D: conductive carbon | Printex XE2B | 1.66 | 1.66 | 1.66 | 1.66 |
| Titanium dioxide | JR600-E | 12.55 | 12.55 | 12.55 | 12.55 |
| Pigment dispersing agent | Disperbyk 191 | 0.93 | 0.93 | 0.93 | 0.93 |
| Leveling agent | BYK-348 | 0.8 | 0.8 | 0.8 | 0.8 |
| Thickening agent | Rheovis AS S130 | 1.1 | 1.1 | 1.1 | 1.1 |
| | Deionized water | 20.71 | 15.03 | 7.46 | 26.85 |
| | Total | 100 | 100 | 100 | 100 |
| A: polyolefin resin | melting point (° C.) | 80 | 80 | 80 | 80 |
| | Weight average molecular weight | 120,000 | 120,000 | 120,000 | 120,000 |
| B: polyurethane resin | Glass transition temperature (° C.) | −49 | −86 | −86 | −60 |
| | Elongation rate (%) | 530 | 650 | 750 | 250 |
| | A/B | 28/72 | 30/70 | 28/72 | 28/72 |
| | C/(A + B) | 5/100 | 5/100 | 5/100 | 5/100 |
| | D/(A + B + C) | 7/93 | 7/93 | 7/93 | 7/93 |

| | Water-based primer coating composition | WP-10 | WP-11 | WP-12 | WP-13 |
|---|---|---|---|---|---|
| A: polyolefin resin | Aqueous dispersion of non-chlorinated polyolefin resin P-1 | 21 | 14.8 | 24.67 | 29.6 |
| B: polyurethane resin | Impranil DLU | 26.5 | 29.6 | 24.67 | 22.2 |
| | Acrit WBR-2181 (*1) | | | | |
| | Pamarin UA-150 (*2) | | | | |
| | Ucoat DA-100 (*3) | | | | |
| | Takelac W6061 (*4) | | | | |
| | Bayhydrol UH2952/1 (*5) | | | | |
| | Acrit WBR-2018 (*6) | | | | |
| | Takelac W6021 (*7) | | | | |
| | Lackstar 5215A (*8) | | | | |
| C: curing agent | DURANATE WM44-L70G | | 1.5 | 1.5 | 1.5 |
| | Mycoat775 (*9) | 2 | | | |
| D: conductive carbon | Printex XE2B | 1.66 | 1.66 | 1.66 | 1.66 |
| Titanium dioxide | JR600-E | 12.55 | 12.55 | 12.55 | 12.55 |
| Pigment dispersing agent | Disperbyk 191 | 0.93 | 0.93 | 0.93 | 0.93 |
| Leveling agent | BYK-348 | 0.8 | 0.8 | 0.8 | 0.8 |

TABLE 1-continued

| | | | | | |
|---|---|---|---|---|---|
| Thickening agent | Rheovis AS S130 | 1.1 | 1.1 | 1.1 | 1.1 |
| | Deionized water | 33.46 | 37.06 | 32.12 | 29.66 |
| | Total | 100 | 100 | 100 | 100 |
| A: polyolefin resin | melting point (° C.) | 80 | 80 | 80 | 80 |
| | Weight average molecular weight | 120,000 | 120,000 | 120,000 | 120,000 |
| B: polyurethane resin | Glass transition temperature (° C.) | −83 | −83 | −83 | −83 |
| | Elongation rate (%) | 800 | 800 | 800 | 800 |
| | A/B | 28/72 | 20/80 | 33/67 | 40/60 |
| | C/(A + B) | 6/100 | 5/100 | 5/100 | 5/100 |
| | D/(A + B + C) | 7/93 | 7/93 | 7/93 | 7/93 |

| Water-based primer coating composition | | WP-14 | WP-15 | WP-16 | WP-17 |
|---|---|---|---|---|---|
| A: polyolefin resin | Aqueous dispersion of non-chlorinated polyolefin resin P-1 | 59.2 | 62.9 | 21 | 21 |
| B: polyurethane resin | Impranil DLU | 7.4 | 5.55 | 26.5 | 26.5 |
| | Acrit WBR-2181 (*1) | | | | |
| | Pamarin UA-150 (*2) | | | | |
| | Ucoat DA-100 (*3) | | | | |
| | Takelac W6061 (*4) | | | | |
| | Bayhydrol UH2952/1 (*5) | | | | |
| | Acrit WBR-2018 (*6) | | | | |
| | Takelac W6021 (*7) | | | | |
| | Lackstar 5215A (*8) | | | | |
| C: curing agent | DURANATE WM44-L70G Mycoat775 (*9) | 1.5 | 1.5 | 0.32 | 3.1 |
| D: conductive carbon | Printex XE2B | 1.66 | 1.66 | 1.66 | 1.66 |
| Titanium dioxide | JR600-E | 12.55 | 12.55 | 12.55 | 12.55 |
| Pigment dispersing agent | Disperbyk 191 | 0.93 | 0.93 | 0.93 | 0.93 |
| Leveling agent | BYK-348 | 0.8 | 0.8 | 0.8 | 0.8 |
| Thickening agent | Rheovis AS S130 | 1.1 | 1.1 | 1.1 | 1.1 |
| | Deionized water | 14.86 | 13.01 | 35.14 | 32.36 |
| | Total | 100 | 100 | 100 | 100 |
| A: polyolefin resin | melting point (° C.) | 80 | 80 | 80 | 80 |
| | Weight average molecular weight | 120,000 | 120,000 | 120,000 | 120,000 |
| B: polyurethane resin | Glass transition temperature (° C.) | −83 | −83 | −83 | −83 |
| | Elongation rate (%) | 800 | 800 | 800 | 800 |
| | A/B | 80/20 | 85/15 | 28/72 | 28/72 |
| | C/(A + B) | 5/100 | 5/100 | 1/100 | 10/100 |
| | D/(A + B + C) | 7/93 | 7/93 | 7/93 | 6/94 |

| Water-based primer coating composition | | WP-18 | WP-19 | WP-20 | WP-21 |
|---|---|---|---|---|---|
| A: polyolefin resin | Aqueous dispersion of non-chlorinated polyolefin resin P-1 | 18.3 | 21 | 21 | 21 |
| B: polyurethane resin | Impranil DLU | 21.5 | 26.5 | 26.5 | 26.5 |
| | Acrit WBR-2181 (*1) | | | | |
| | Pamarin UA-150 (*2) | | | | |
| | Ucoat DA-100 (*3) | | | | |
| | Takelac W6061 (*4) | | | | |
| | Bayhydrol UH2952/1 (*5) | | | | |
| | Acrit WBR-2018 (*6) | | | | |
| | Takelac W6021 (*7) | | | | |
| | Lackstar 5215A (*8) | | | | |
| C: curing agent | DURANATE WM44-L70G Mycoat775 (*9) | 7.8 | 1.5 | 1.5 | 1.5 |
| D: conductive carbon | Printex XE2B | 1.66 | 0.47 | 3.21 | 5 |
| Titanium dioxide | JR600-E | 12.55 | 3.55 | 24.27 | 37.65 |
| Pigment | Disperbyk 191 | 0.93 | 0.26 | 1.8 | 2.5 |

TABLE 1-continued

|  |  |  |  |  |  |
|---|---|---|---|---|---|
| dispersing agent |  |  |  |  |  |
| Leveling agent | BYK-348 | 0.8 | 0.8 | 0.8 | 0.8 |
| Thickening agent | Rheovis AS S130 | 1.1 | 1.1 | 1.1 | 1.1 |
|  | Deionized water | 25.95 | 44.82 | 19.82 | 3.95 |
|  | Total | 90.59 | 100 | 100 | 100 |
| A: polyolefin resin | melting point (° C.) | 80 | 80 | 80 | 80 |
|  | Weight average molecular weight | 120,000 | 120,000 | 120,000 | 120,000 |
| B: polyurethane resin | Glass transition temperature (° C.) | −83 | −83 | −83 | −83 |
|  | Elongation rate (%) | 800 | 800 | 800 | 800 |
|  | A/B | 28/72 | 28/72 | 28/72 | 28/72 |
|  | C/(A + B) | 30/100 | 5/100 | 5/100 | 5/100 |
|  | D/(A + B + C) | 7/93 | 2/98 | 12/88 | 18/82 |

Various combinations of components shown in detail in Table 1 are described below.
(*1) Acrit WBR-2181 (Taisei Fine Chemical Co., Ltd., solid resin content 33%, Tg-89° C., elongation rate 700%)
(*2) Permarin UA-150 Sanyo Chemical Industries, Ltd., solid resin content 30%, Tg-87° C., elongation rate 600%)
(*3) Ucoat DA-100 (Sanyo Chemical Industries, Ltd., solid resin content 35%, Tg-80° C., elongation rate 500%)
(*4) Takelac W6061 (Mitsui Chemicals Ltd., solid resin content 30%, Tg-78° C., elongation rate 1000%)
(*5) Bayhydrol UH2952/1 (Covestro Japan Ltd., solid resin content 40%, Tg-49° C., elongation rate 530%)
(*6) Acrit WBR-2018 (Taisei Fine Chemical Co., Ltd., solid resin content 32.5%, Tg-86° C., elongation rate 660%)
(*7) Takelac WS6021 (Mitsui Chemicals Ltd., solid resin content 30%, Tg-86° C., elongation rate 750%)
(*8) Lackstar 5215A (DIC KK, solid resin content 47.3%, Tg-60° C., elongation rate 250%)
(*9) Mycoat 775 (melamine resin, Allnex Japan KK, solid resin content 70%)

Production Example 4: Production of Polyester Resin Varnish PA-1

54.0 Parts of dimer acid (tradename EMPOL 1008, Cognis KK, 36 carbon atoms), 8.0 parts of neopentyl glycol, 17.8 parts of isophthalic acid, 19.4 parts of 1,6-hexane diol, and 0.8 parts of trimethylolpropane were charged in a reaction vessel equipped with a reflux condensing tube, to which a reaction water separation tube was fitted, a nitrogen gas introduction device, a thermometer, and a stirring device, this heated to 120° C. so as to dissolve the raw materials and then heated to 160° C. while stirring. After maintaining a temperature of 160° C. for 1 hour, it was gradually heated to 230° C. over 5 hours. The temperature was maintained at 230° C. and the reaction continued, when the acid value of the resin reached 4 mg KOH/g the temperature was reduced to 80° C. or lower and 31.6 parts of methyl ethyl ketone were added to produce a polyester resin varnish PA-1 having characteristic values of a solid resin content of 74.6%, a hydroxyl group value of 62 mg KOH/g, an acid value of 4 mg KOH/g and a number average molecular weight of 1,800.

Production Example 5: Production of Polyurethane Resin WB-1

78.3 Parts polyester resin solution PA-1, 7.8 parts dimethylolpropionic acid, 1.4 parts neopentyl glycol, and 40.0 parts methylethyl ketone were charge into a reactor fitted with a nitrogen gas delivery apparatus, a thermometer, and stirring apparatus, and after heating to 80° C. with stirring, 27.6 parts isophorone diisocyanate was added and reacted while keeping the components at 80° C. When the isocyanate value was 0.43 meq/g, 4.8 parts trimethylolpropane was added and the reaction was allowed to continue at 80° C. Then, when the isocyanate value was 0.01 meq/g, 33.3 parts butyl cellosolve was added to terminate the reaction. Subsequently, it was heated to 100° C. and methylethyl ketone was removed under reduced pressure. The temperature was reduced to 50° C., 4.4 parts of dimethylethanolamine was added to neutralize the acid groups, 147.9 parts deionized water was then added to produce a polyurethane resin (WB-1) having characteristic values of a solid resin content of 35.0%, a hydroxyl group value of 40 mg KOH/g, an acid value of 35 mg KOH/g, and a number average molecular weight of 4,900.

Production Example 6: Production of Core/Shell-Type Emulsion WC-1

46.4 Parts polyurethane resin WB-1 and 33.1 parts deionized water were charged into a reactor fitted with nitrogen gas delivery apparatus, a thermometer, dropping funnel, and stirring apparatus, and after heating to 85° C. with stirring, a homogenous mixture of 4.9 parts styrene, 4.5 parts methyl methacrylate, 3.9 parts n-butyl acrylate, 3.0 parts 2-hydroxyethylmethacrylate, 3.8 parts propylene glycol monomethyl ether, and 0.24 parts the polymerization initiator t-butylperoxy-2-ethylhexanoate which was added dropwise at a constant rate over a period of 3.5 hours using the dropping funnel. Following completion of dropwise addition, the temperature was maintained at 85° C. for 1 hour, after which a polymerization initiator solution obtained by dissolving 0.03 parts of the polymerization initiator t-butylperoxy-2-ethylhexanoate in 0.14 parts of propylene glycol monomethyl ether was added as an additional catalyst, and after maintaining the temperature at 85° C. for a further 1 hour, the reaction was terminated to obtain a core/shell-type emulsion resin (WC-1) having a resin solid content of 32.5%. The hydroxyl group value of the core portion acrylic resin was 80 mg KOH/g and the acid value was 0 mg KOH/g.

Production Example 7: Production of 1st Water-Based Coloring Coating Composition WD-1

Using the water-based polyurethane resin WB-1 as a dispersion resin, 33.8 parts titanium dioxide (tradename TiPure R706, DuPont KK) and 0.4 parts carbon black (tradename MA-100, Mitsubishi Chemicals KK) were dispersed in a motor mill and a pigment paste was produced. Then, 25.5 parts core/shell-type emulsion WC-1 and 5.9 parts water-based polyurethane resin WB-1 and water-based acrylic resin (tradename SETAQUA6511, Nuplex Resins KK, acid value 8 mg KOH/g, hydroxyl group value 138 mg KOH/g, glass transition temperature 12° C., solid resin content 47%) were mixed in a dissolver and, after the resin base was prepared, the pigment paste created earlier was added and mixed. Finally, 6.6 parts polyisocyanate (tradename Bayhydur 3100, Sumika Bayer Urethane Co., Ltd., solid resin content 100%) was added and mixed to obtain the 1st water-based coloring coating composition WD-1. The content of water-based polyurethane resin WB-1 in the 1st water-based coloring coating composition WD-1 was set at 47.4 parts.

Production Example 8: Production of WD-2 1st Water-Based Coloring Coating Composition The 1st water-based coloring coating composition WD-2 was obtained using the same method as in production example 7 based on combinations shown in Table 2.

TABLE 2

| 1st Water-based coloring coating composition | WD-1 | WD-2 |
|---|---|---|
| Core/shell type emulsion WC-1 (solid resin content 32.5%) | 25.5 | 25.5 |
| Water-based polyurethane resin WB-1 (solid resin content 35.0%) | 47.4 | 47.4 |
| Water-based acrylic resin (solid resin content 47.0%) | 5.9 | 5.9 |
| Polyisocyanate (*10) | 6.6 | |
| Polycarbodiimide (*11) | | 12.8 |
| Titanium dioxide (*12) | 33.8 | 32.4 |
| Carbon black (*13) | 0.4 | 0.4 |
| Total | 119.6 | 124.4 |
| Core/shell-type emulsion | 30% | 30% |
| Water-based polyurethane resin | 60% | 60% |
| Water-based acrylic resin | 10% | 10% |
| NCO/OH (molar ratio) | 1.0 | |
| NCN/COOH (molar ratio) | | 1.0 |
| P/B | 1.0 | 1.0 |

Production Example 9: Production of WE-1 2nd Water-Based Coloring Coating Composition Using water-based polyurethane resin WB-1 as a dispersion resin, 2.5 parts carbon black (tradename: MA-100, Mitsubishi Chemical KK) was dispersed in a motor mill and a pigment paste was prepared.

Then, 25.5 parts core/shell-type emulsion WC-1 and 5.9 parts water-based polyurethane resin WB-1 and water-based acrylic resin (tradename SETAQUA6511, Nuplex Resins KK, acid value 8 mg KOH/g, hydroxyl group value 138 mg KOH/g, glass transition temperature 12° C., solid resin content 47%) were mixed in a dissolver and, after the resin base was prepared, the pigment paste created earlier was added and mixed.

Finally, 6.6 parts of polyisocyanate (trade name: Bayhydur 3100, Sumika Bayer Urethane Co., Ltd., resin solid content 100%) was added and mixed and the 2nd water-based coloring coating composition WE-1 was obtained. The amount of water-based polyurethane resin WB-1 in the 2nd water-based coloring coating composition WE-1 was set at 47.4 parts.

Production Example 10: Production of WE-2 and WE-3 2nd Water-Based Coloring Coating Compositions 2nd Water-based coloring coating compositions WE-2 and WE-3 were obtained using the same method as in production example 8 based on combinations shown in Table 3.

TABLE 3

| 2nd Water-based coloring coating composition | WE-1 | WE-2 | WE-3 |
|---|---|---|---|
| Core/shell type emulsion WC-1 (solid resin content 32.5%) | 25.5 | 25.5 | 25.5 |
| Water-based polyurethane resin WB-1 (solid resin content 35.0%) | 47.4 | 47.4 | 47.4 |
| Water-based acrylic resin (solid resin content 47.0%) | 5.9 | 5.9 | 5.9 |
| Polyisocyanate (*10) | 6.6 | | |
| Polycarbodiimide compound (*11) | | 12.8 | |
| Carbon black (*13) | 2.5 | 2.4 | 2.1 |
| Total | 87.9 | 94.0 | 80.9 |
| Core/shell type emulsion | 30% | 30% | 30% |
| Water-based polyurethane resin | 60% | 60% | 60% |
| Water-based acrylic resin | 10% | 10% | 10% |
| NCO/OH (molar ratio) | 1.0 | | |
| NCN/COOH (molar ratio) | | 1.0 | |
| P/B | 0.1 | 0.1 | 0.1 |

Various combinations of components shown in in Tables 2-3 are described in detail below.

(*10) Polyisocyanate (trade name: Bayhydur 3100, Sumika Bayer Urethane Co., Ltd.)

(*11) Polycarbodiimide (trade name: Carbodilite V-02-L2, Nisshinbo Chemical Co., Ltd.)

(*12) Titanium dioxide (trade name: TiPure R706, DuPont Co. Ltd.)

(*13) Carbon black (trade name: MA-100, Mitsubishi Chemical Co. Ltd.)

Production Example 11: Production Example of CC-1 Clear Coating Composition (i) Production of CA-1 Acrylic Resin Solution for Clear Coating 24 Parts propylene glycol monomethyl ether was introduced into a four-necked flask fitted with a thermometer, a reflux condenser, a stirrer, and a dropping funnel and heated while being stirred under a current of nitrogen gas and maintained at 120° C. Next, 9.7 parts styrene, 26.6 parts ethylhexyl methacrylate, 27.3 parts 2-hydroxyethyl methacrylate, and 1.3 parts of the radical polymerizable monomer acrylic acid were mixed at 120° C. to homogeneity to form a monomer dropping component. In addition, 2.4 parts a,a'-azobisisobutyronitrile was completely dissolved in 7 parts propylene glycol monomethyl ether with stirring to form an initiator dropping component. The monomer dropping component and the initiator dropping component were added using separate dropping funnels dropwise at a set rate at the same time over 3 hours. After completion of dropping, the same temperature was maintained for 1 hour, a solution prepared by completely dissolving 0.2 parts a,a'-azobisisobutyronitrile in 1.5 parts propylene glycol monomethyl ether, as an additional catalyst, was added dropwise divided into several times within 30 minutes. Subsequently, the polymerization reaction was completed when maintained at 120° C. for 1 hour and acrylic resin solution CA-1 was obtained. The solid resin content of acrylic resin CA-1 was 67.5%, the hydroxyl group value was 174 mg KOH/g, the acid value was 10 mg KOH/g, and the weight average molecular weight was 6,000.

(ii) Production of CC-1 Clear Coating Material

80 Parts acrylic resin solution CA-1 was charged into a reactor fitted with a stirrer, then 8 parts Solvesso #100 (tradename, Exon Mobil, aromatic naphtha), 3 parts xylene, 0.1 parts BYK-300 (tradename, BYK Chemical, surface regulator, 10 mass % xylene solution), 2.5 parts Tinuvin 292 (tradename, Ciba Specialty Chemicals Inc., photostabilizer, 20 mass % xylene solution), and 5 parts Tinuvin 900 (tradename, Ciba Specialty Chemicals Inc., ultraviolet absorbing agent, 20 mass % xylene solution) were added in succession with stirring and mixed to homogeneity. Next, 1 part Flownon SH-290 (tradename, Kyoeisha Chemical, viscosity adjuster, 10 mass % xylene solution) and 0.4 parts Neostann U-100 (tradename, Johoku Chemical, isocyanate curing catalyst, 1 mass % xylene solution) were added in succession with stirring and sufficiently stirred to form a homogenous mixture. Immediately before use, 40 parts Duranate THA-100 (tradename, Asahi Kasei Corp., HMDI-type isocyanurate-type polyisocyanate curing agent, solid resin content 75%, NCO 23.1 mass %) and 15 parts of a mixture of Solvesso #100/butyl acetate/propylene glycol monomethyl ether (mixing ratio: 60/20/20) to 100 parts the obtained mixture were added with stirring to obtain CC-1 clear coating material.

Example 1

A cationic electrodeposition coating material (tradename, CathoGuard No. 500, BASF Japan KK) was coated by electrostatic deposition on a zinc phosphate-treated mild steel plate to a thickness after drying of 20 μm and then fired for 25 minutes at 175° C. to obtain an electrodeposition coated plate used in the present evaluation (hereinafter referred to as the electrodeposited plate).

Polypropylene SP-853 with its surface wiped with isopropyl alcohol was used as a plastic material.

Water-based primer coating material WP-1 was applied to the electrodeposition plate and the polypropylene material to a thickness after drying of 6-8 μm. Thereafter, it was kept at room temperature for 5 minutes and the 1st water based coating WD-1 was coated to a thickness after drying of 20 μm. Again, it was kept at room temperature for 5 minutes and the 2nd water based coating WE-1 was coated to a thickness after drying of 12 μm. After coating, it was left for 5 minutes at room temperature and preheating at 80° C. for 5 minutes was carried out. After allowing the plate to cool to room temperature, a clear coat of coating material CC-1 was coated to a thickness after drying of 30 μm. After coating, these were left for 10 minutes at room temperature, fired for 30 minutes at 80° C. to obtain evaluation plates.

The following coating film performance evaluation was carried out for the obtained evaluation plates.

(Appearance of Coating Film)

The appearance of the coating film on the obtained evaluation plate was observed visually and evaluated using the following standard.

○: smoothness, gloss, vividness all good
Δ: any of the smoothness, gloss, vividness slightly inferior
x: any of the smoothness, gloss, vividness notably inferior (Adhesion)

11 Sections were introduced lengthwise and crosswise onto the obtained evaluation plates with a knife to obtain 100 squares at 2 mm intervals then they were evaluated according to the following standards by the number of squares remaining without coating film peeling when peeled off in one go from adhering cellophane tape.

○: No peeling away of the coating film (as squares, 100/100)

Δ: Some peeling away of the coating film (as squares, 95-99/100)

x: Almost all of the coating film peeled away (as squares, 0-94/100)

(Moisture Resistance)

An obtained evaluation plate was placed in a constant temperature and humidity chamber at 50° C. and 95% humidity and left for 240 hours. Thereafter, the coated plate was removed and abnormalities in appearance and extent of swelling of the coating film were investigated. 2 Hours after removal, adhesion was evaluated after the moisture resistance test using the same method as the abovementioned adhesion evaluation. The coating film appearance after the moisture resistance test were evaluated using the following standards.

○: No abnormalities in the coating film.

Δ: Fine bumps in the coating film and slightly abnormal appearance.

x: Coating film swelling and some appearance of abnormalities.

An evaluation of adhesion after the moisture test was carried out in the same way as the above adhesion evaluation.

(Chipping Resistance)

A test panel holder was fixed at a right angle to the stone outlet in a Suga Test Instruments Co., Ltd. flying stone test apparatus JA-400 (chipping test apparatus), 50 g of granite gravel having a particle size of No. 7 was sprayed onto the surface of a multilayer coating film using the sample plates under an air pressure of 0.4 MPa and at −20° C., the extent of appearance of scratches was observed visually and evaluated using the following standards.

◎: The size of scratches very small and upper coating film a little scratched

○: The size of scratches fairly small and the water-based coating materials (product of the present invention) slightly exposed Δ: The size of scratches fairly small but the underlying steel plate exposed x: The size of scratches fairly large but the underlying steel plate markedly exposed Examples 2-21, Comparative Examples 1, 2

Evaluation plates were prepared using combinations of water-based primer coating composition, 1st water-based coloring coating composition, 2nd water-based coloring coating composition, and clear coating composition disclosed in Table 4-5 using the same method as in example 1 and an evaluation of the coating film performance was carried out. The results of an evaluation of coating film performance are summarized in Table 4-5.

TABLE 4

| | | Example 1 | Example 2 | Example 3 | Example 4 | Example 5 |
|---|---|---|---|---|---|---|
| Water-based primer coating composition | | WP-1 | WP-2 | WP-3 | WP-4 | WP-5 |
| 1st Water-based coloring coating composition | | WD-1 | WD-1 | WD-1 | WD-1 | WD-1 |
| 2nd Water-based coloring coating composition | | WE-1 | WE-1 | WE-1 | WE-1 | WE-1 |
| Clear coating composition | | CC-1 | CC-1 | CC-1 | CC-1 | CC-1 |
| Water-based primer coating composition | | | | | | |
| A: polyolefin resin | melting point (° C.) | 80 | 80 | 80 | 80 | 80 |
| | weight average molecular weight | 120,000 | 120,000 | 120,000 | 120,000 | 120,000 |
| B: polyurethane resin | glass transition temperature (° C.) | −83 | −89 | −87 | −80 | −78 |
| | elongation rate | 800 | 700 | 600 | 500 | 1000 |
| composition | A/B | 28/72 | 28/72 | 28/72 | 28/72 | 28/72 |
| | C/(A + B) | 5/100 | 5/100 | 5/100 | 5/100 | 5/100 |
| | D/(A + B + C) | 7/93 | 7/93 | 7/93 | 7/93 | 7/93 |
| Coating film quality | | | | | | |
| Material: electrodeposition plate | coating film appearance | ○ | ○ | ○ | ○ | ○ |
| | adhesion | ○ | ○ | ○ | ○ | ○ |
| | moisture resistance (coating film appearance) | ○ | ○ | ○ | ○ | ○ |
| | moisture resistance (adhesion) | ○ | ○ | ○ | ○ | ○ |
| | chipping resistance | ⊚ | ⊚ | ⊚ | ⊚ | ○ |
| Material: polypropylene | coating film appearance | ○ | ○ | ○ | ○ | ○ |
| | adhesion | ○ | △ | ○ | ○ | △ |
| | moisture resistance (coating film appearance) | ○ | △ | ○ | ○ | △ |
| | moisture resistance (adhesion) | ○ | △ | ○ | ○ | △ |

| | | Example 6 | Example 7 | Example 8 | Example 9 | Example 10 | Example 11 | Example 12 | Example 13 |
|---|---|---|---|---|---|---|---|---|---|
| Water-based primer coating composition | | WP-7 | WP-8 | WP-10 | WP-11 | WP-12 | WP-13 | WP-14 | WP-15 |
| 1st Water-based coloring coating composition | | WD-1 | WD-1 | WD-1 | WD-1 | WD-1 | WD-1 | WD-1 | WD-1 |
| 2nd Water-based coloring coating composition | | WE-1 | WE-1 | WE-1 | WE-1 | WE-1 | WE-1 | WE-1 | WE-1 |
| Clear coating composition | | CC-1 | CC-1 | CC-1 | CC-1 | CC-1 | CC-1 | CC-1 | CC-1 |
| Water-based primer coating composition | | | | | | | | | |
| A: polyolefin resin | melting point (° C.) | 80 | 80 | 80 | 80 | 80 | 80 | 80 | 80 |
| | weight average molecular weight | 120,000 | 120,000 | 120,000 | 120,000 | 120,000 | 120,000 | 120,000 | 120,000 |
| B: polyurethane resin | glass transition temperature (° C.) | −86 | −86 | −83 | −83 | −83 | −83 | −83 | −83 |
| | elongation rate | 660 | 750 | 800 | 800 | 800 | 800 | 800 | 800 |
| composition | A/B | 30/70 | 28/72 | 28/72 | 20/80 | 33/67 | 40/60 | 80/20 | 85/15 |
| | C/(A + B) | 5/100 | 5/100 | 6/100 | 5/100 | 5/100 | 5/100 | 5/100 | 5/100 |
| | D/(A + B + C) | 7/93 | 7/93 | 7/93 | 7/93 | 7/93 | 7/93 | 7/93 | 7/93 |

TABLE 4-continued

| Coating film quality | | | | | | | | | |
|---|---|---|---|---|---|---|---|---|---|
| Material: electrodeposition plate | coating film appearance | ○ | ○ | ○ | ○ | ○ | ○ | ○ | ○ |
| | adhesion | ○ | ○ | ○ | ○ | ○ | ○ | ○ | ○ |
| | moisture resistance (coating film appearance) | ○ | ○ | ○ | ○ | ○ | ○ | ○ | ○ |
| | moisture resistance (adhesion) | ○ | ○ | ○ | ○ | ○ | ○ | ○ | ○ |
| | chipping resistance | ◎ | ◎ | ◎ | ◎ | ◎ | ◎ | ○ | Δ |
| Material: polypropylene | coating film appearance | ○ | ○ | ○ | ○ | ○ | ○ | ○ | ○ |
| | adhesion | ○ | ○ | ○ | ○ | ○ | ○ | ○ | ○ |
| | moisture resistance (coating film appearance) | ○ | ○ | ○ | ○ | ○ | ○ | ○ | ○ |
| | moisture resistance (adhesion) | ○ | ○ | ○ | Δ | ○ | ○ | ○ | ○ |

| | | Example 14 | Example 15 | Example 16 | Example 17 | Example 18 | Example 19 | Example 20 | Example 21 |
|---|---|---|---|---|---|---|---|---|---|
| Water-based primer coating composition | | WP-16 | WP-17 | WP-18 | WP-19 | WP-20 | WP-21 | WP-1 | WP-1 |
| 1st Water-based coloring coating composition | | WD-1 | WD-1 | WD-1 | WD-1 | WD-1 | WD-1 | WD-1 | WD-1 |
| 2nd Water-based coloring coating composition | | WE-1 | WE-1 | WE-1 | WE-1 | WE-1 | WE-1 | WE-2 | WE-3 |
| Clear coating composition | | CC-1 | CC-1 | CC-1 | CC-1 | CC-1 | CC-1 | CC-1 | CC-1 |
| Water-based primer coating composition | | | | | | | | | |
| A: polyolefin resin | melting point (° C.) | 80 | 80 | 80 | 80 | 80 | 80 | 80 | 80 |
| | weight average molecular weight | 120,000 | 120,000 | 120,000 | 120,000 | 120,000 | 120,000 | 120,000 | 120,000 |
| B: polyurethane resin | glass transition temperature (° C.) | −83 | −83 | −83 | −83 | −83 | −83 | −83 | −83 |
| | elongation rate | 800 | 800 | 800 | 800 | 800 | 800 | 800 | 800 |
| composition | A/B | 28/72 | 28/72 | 28/72 | 28/72 | 28/72 | 28/72 | 28/72 | 28/72 |
| | C/(A + B) | 1/100 | 10/100 | 30/100 | 5/100 | 5/100 | 5/100 | 5/100 | 5/100 |
| | D/(A + B + C) | 7/93 | 6/94 | 7/93 | 2/98 | 12/88 | 18/82 | 7/93 | 7/93 |
| Coating film quality | | | | | | | | | |
| Material: electrodeposition plate | coating film appearance | ○ | ○ | ○ | ○ | ○ | ○ | ○ | ○ |
| | adhesion | ○ | ○ | ○ | ○ | ○ | ○ | ○ | ○ |
| | moisture resistance (coating film appearance) | ○ | ○ | ○ | ○ | ○ | ○ | ○ | ○ |
| | moisture resistance (adhesion) | ○ | ○ | ○ | ○ | ○ | ○ | ○ | ○ |
| | chipping resistance | ○ | ◎ | ○ | ◎ | ◎ | ◎ | ◎ | ◎ |
| Material: polypropylene | coating film appearance | ○ | ○ | ○ | ○ | ○ | ○ | ○ | ○ |
| | adhesion | ○ | ○ | ○ | ○ | ○ | ○ | ○ | ○ |
| | moisture resistance (coating film appearance) | ○ | ○ | ○ | ○ | ○ | ○ | ○ | ○ |
| | moisture resistance (adhesion) | ○ | ○ | ○ | ○ | ○ | ○ | ○ | ○ |

The invention claimed is:

1. A method of forming a multilayer coating film, the method comprising:
   a step of coating, onto an object to be coated, a water-based primer coating composition;
   a step of wet-on-wet coating a first water-based coloring coating composition;
   a step of wet-on-wet coating a second water-based coloring coating composition;
   a step of coating a clear coating composition; and
   a step of simultaneous hardening of the multilayer coating film, wherein:
   (1) the water-based primer coating composition contains components:
       (A) a water-based polyolefin resin with a melting point of 60-100° C. and a weight average molecular weight in the range of 50,000-250,000,
       (B) a water-based polyurethane resin having a glass transition temperature (Tg) of −100 to −70° C. and an elongation rate of 500% or more at −20° C.,
       (C) a curing agent, and
       (D) conductive carbon,
   (2) the first water-based coloring coating composition and second water-based coloring coating composition each contain a core/shell emulsion comprising an acrylic resin core portion and a polyurethane resin shell portion as base resins, and
   (3) the clear coating composition contains a hydroxy-group-containing acrylic resin and a polyisocyanate compound.

2. The method of forming a multilayer coating film of claim 1, wherein the mass ratio of water-based primer coating composition component (A) and component (B) is 20/80-80/20 as solid resin content, the mass ratio of component (C) and [component (A)+component (B)] is 1/100-30/100 as solid content, and the mass ratio of component (D) and [component (A)+component (B)+component (C)] is 2/98-20/80 as solid content.

3. The method of forming a multilayer coating film of claim 1, wherein aqueous primer coating composition component (B) is a colloidal dispersion or emulsion aqueous polyurethane resin.

4. The method of forming a multilayer coating film of claim 1, wherein aqueous primer coating composition component (B) is an aqueous polyurethane resin obtained by chain elongation using a polyester polyol, a polycarbonate polyol, or a polyurethane obtained by reacting a polyether polyol and a polyisocyanate.

5. The method of forming a multilayer coating film of claim 1, wherein the mass ratio of the core portion and the shell portion in the core/shell emulsion resin in the first water-based coloring coating composition and second water-based coloring coating composition base resin is between 20/80 and 80/20, the core portion acrylic resin has a hydroxyl group value of 10-85 mg KOH/g and an acid value of 0-30 mg KOH/g, the shell portion polyurethane resin has a hydroxyl group value of 20-80 mg KOH/g and an acid value of 10 to 60 mg KOH/g, and the mass ratio of constituent units based on dibasic acids and/or dihydric alcohols having 10 to 60 carbon atoms in the shell portion polyurethane resin is 10-50 parts by mass relative to the solid resin content of the polyurethane resin taken as 100 parts by mass.

6. The method of forming a multilayer coating film of claim 1, wherein the first water-based coloring coating composition and the second water-based coloring coating composition are each characterized by having a mass ratio of the core/shell emulsion of 5-80 mass % relative to 100 mass % for the resin solid content in the base resin.

7. The method of forming a multilayer coating film of claim 1, wherein the first water-based coloring coating composition contains a polyisocyanate compound and/or a polycarbodiimide as a curing agent.

8. The method of forming a multilayer coating film of claim 1, wherein aqueous primer coating composition component (B) is an aqueous polyurethane resin obtained by chain elongation using a polyester polyol, a polycarbonate polyol, or a polyurethane obtained by reacting a polyether polyol and a polyisocyanate and a low molecular weight compound having at least 2 active hydrogens in 1 molecule.

* * * * *